United States Patent
Tsuchiya

(10) Patent No.: US 6,951,419 B2
(45) Date of Patent: Oct. 4, 2005

(54) TRANSPARENT FACE TEMPERATURE SENSOR AND TRANSPARENT FACE TEMPERATURE CONTROLLER

(75) Inventor: Hideharu Tsuchiya, Fujinomiya (JP)

(73) Assignee: Tokai Hit Co., Ltd., Fujinomiya (JP)

( * ) Notice: Subject to any disclaimer, the term of this patent is extended or adjusted under 35 U.S.C. 154(b) by 34 days.

(21) Appl. No.: 10/433,563

(22) PCT Filed: Dec. 10, 2001

(86) PCT No.: PCT/JP01/10819

§ 371 (c)(1),
(2), (4) Date: Jun. 5, 2003

(87) PCT Pub. No.: WO02/48664

PCT Pub. Date: Jun. 20, 2002

(65) Prior Publication Data

US 2004/0026410 A1 Feb. 12, 2004

(30) Foreign Application Priority Data

Dec. 13, 2000 (JP) ........................... 2000-378776
Sep. 3, 2001 (JP) ........................... 2001-265386

(51) Int. Cl.⁷ .................... G01K 13/12; G01K 7/02; G01K 7/16
(52) U.S. Cl. .................. 374/100; 374/164; 374/179; 374/183
(58) Field of Search ................. 374/100, 120, 374/163, 164, 179, 180, 181, 182, 183

(56) References Cited

U.S. PATENT DOCUMENTS

| | | | | |
|---|---|---|---|---|
| 4,358,957 A | * | 11/1982 | Lougheed et al. | 374/179 |
| 4,629,862 A | * | 12/1986 | Kitagawa et al. | 359/395 |
| 4,808,009 A | * | 2/1989 | Sittler et al. | 374/164 |
| 5,054,936 A | * | 10/1991 | Fraden | 374/164 |
| 5,181,382 A | * | 1/1993 | Middlebrook | 359/395 |
| 6,402,372 B1 | * | 6/2002 | Saunders | 374/179 |
| 6,493,135 B1 | * | 12/2002 | Engelhardt | 359/395 |

FOREIGN PATENT DOCUMENTS

| | | |
|---|---|---|
| JP | U 64-33462 | 3/1989 |
| JP | A 02-231538 | 9/1990 |
| JP | A 06-113540 | 4/1994 |
| JP | A 07-2714 | 1/1995 |
| JP | U 3016894 | 8/1995 |
| JP | A 07-301750 | 11/1995 |
| JP | A 08-219896 | 8/1996 |

* cited by examiner

Primary Examiner—Gail Verbitsky
Assistant Examiner—Madeline Gonzalez
(74) Attorney, Agent, or Firm—Oliff & Berridge, PLC

(57) ABSTRACT

A transparent face temperature sensor 3 for measuring temperature comprises a transparent insulating substrate 7 for the sensor, a transparent electrically conductive film 9 for the sensor provided on at least either one of the surfaces of the substrate, a pair of terminals 11 connected to the film. The wires 13 are made of copper and constantan, respectively. The sensor 3 is bonded in electrical insulation conditions, to the a transparent face heater 5, via a insulating sheet 25 and a silicone resin, and hold in a housing 27. Temperature-measuring point is not one point, but an entire surface. Accordingly, the face temperature sensor 3 can detect the average temperature over the entire surface of the sensor film 9.

14 Claims, 20 Drawing Sheets

Fig 6
(a)
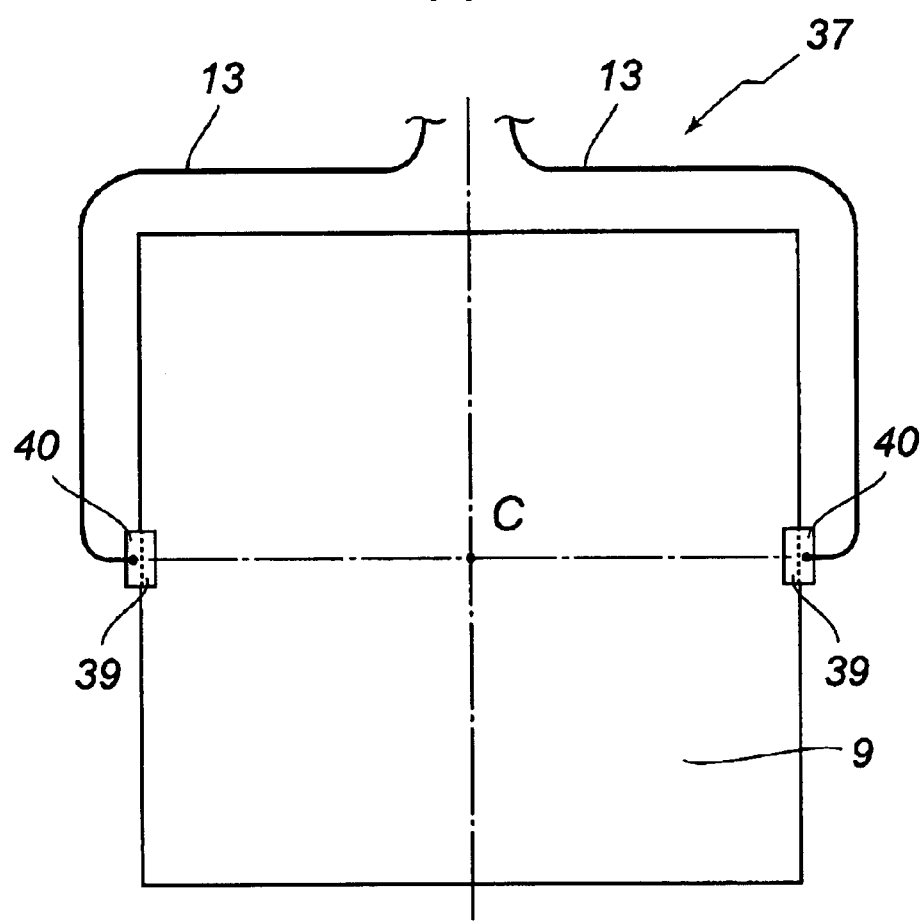
(b)
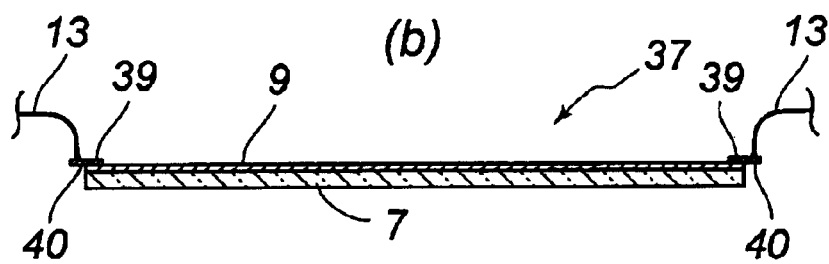

Fig 7
(a)
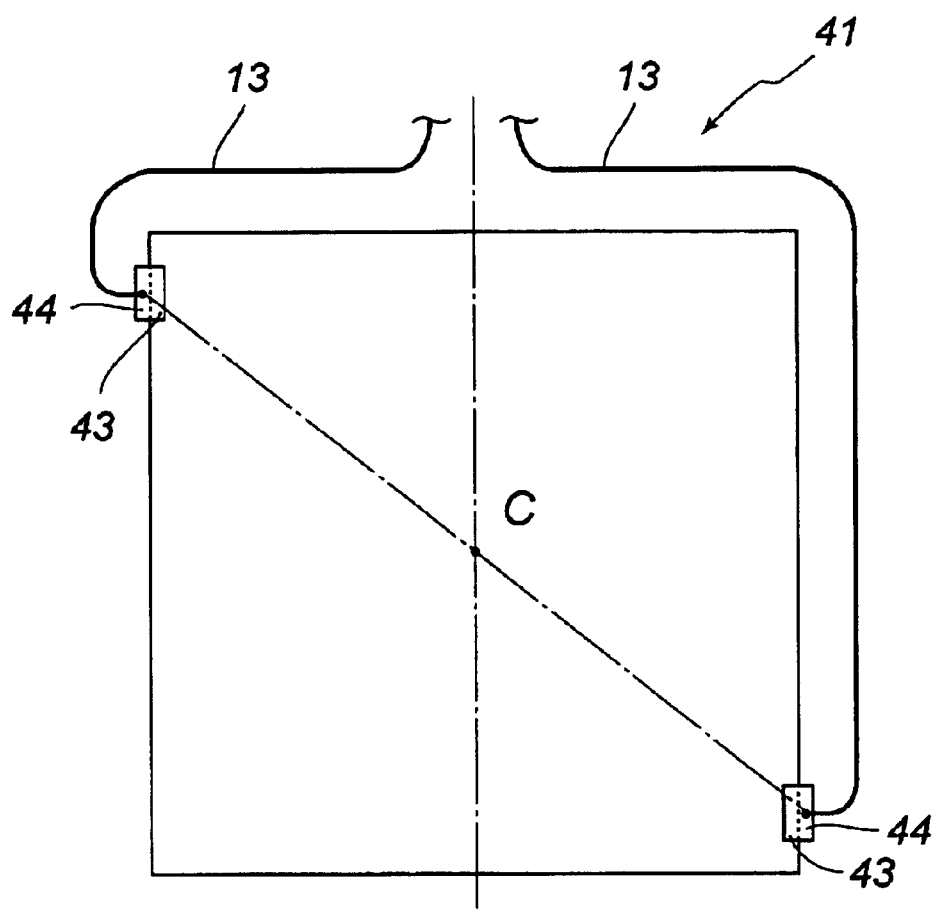
(b)
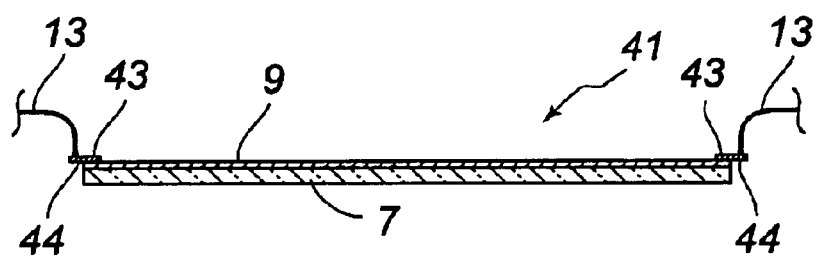

Fig 14
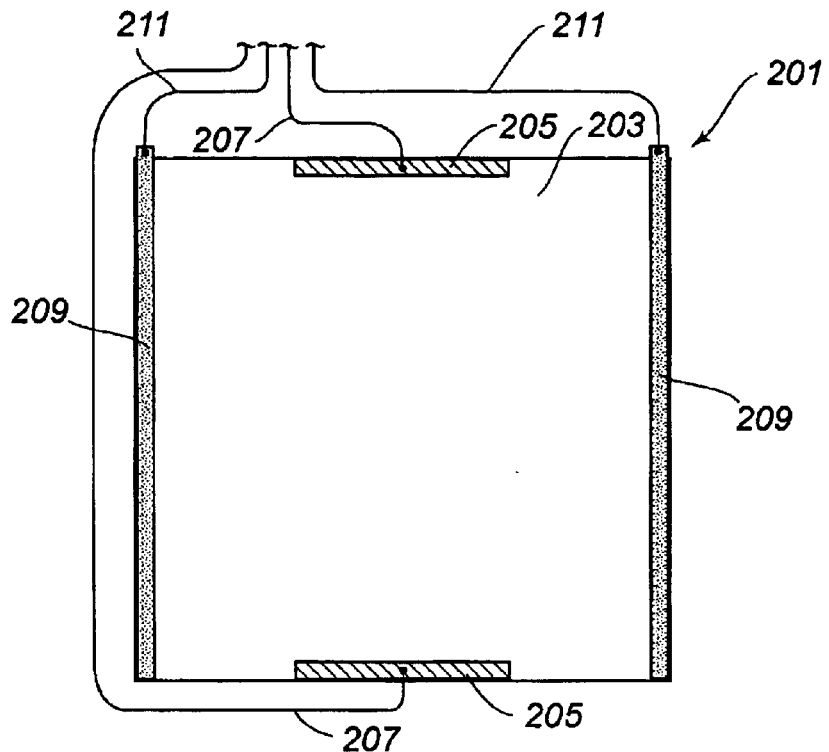
(a)
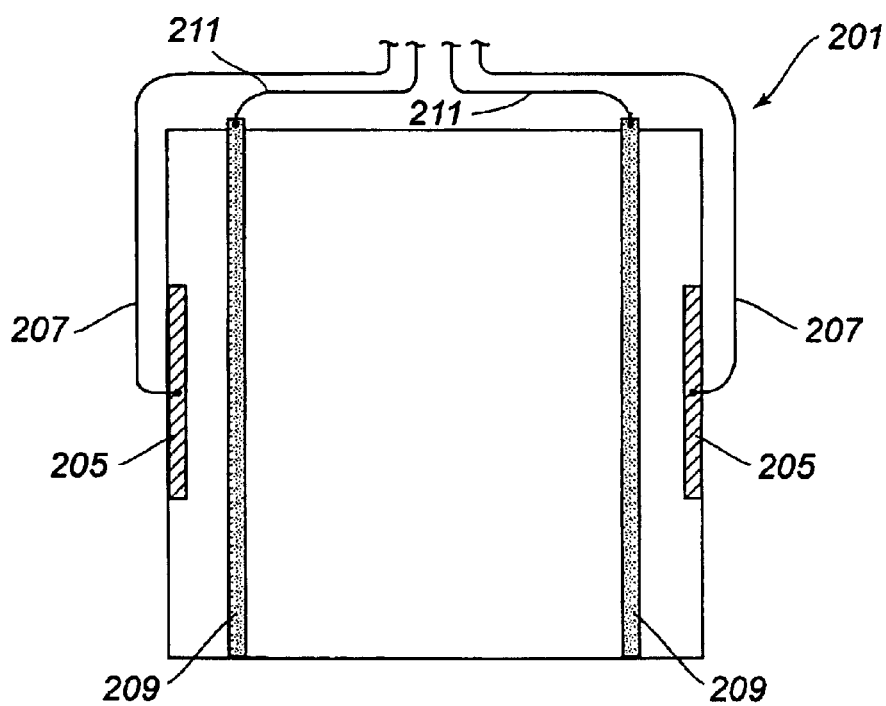
(b)

Fig 15
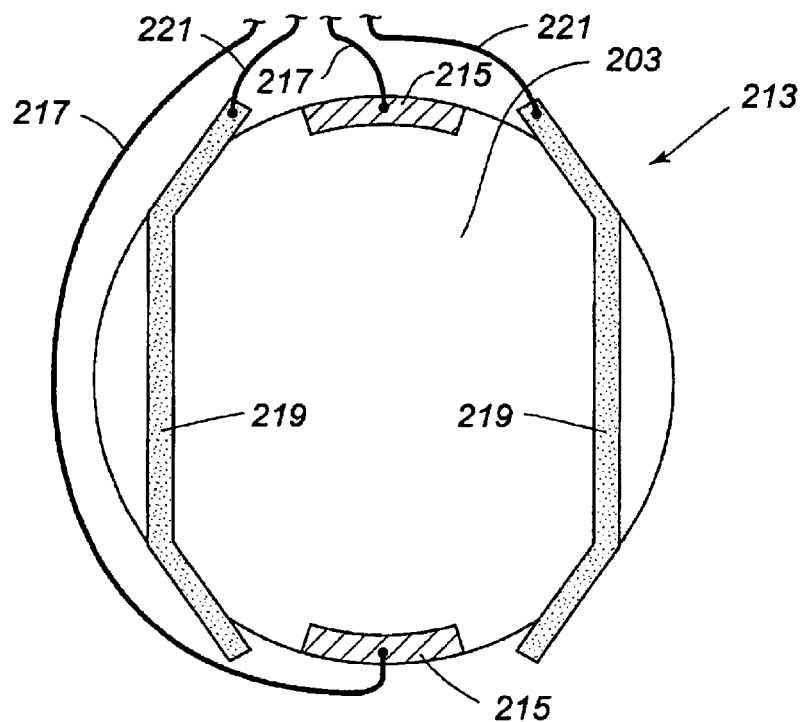
(a)
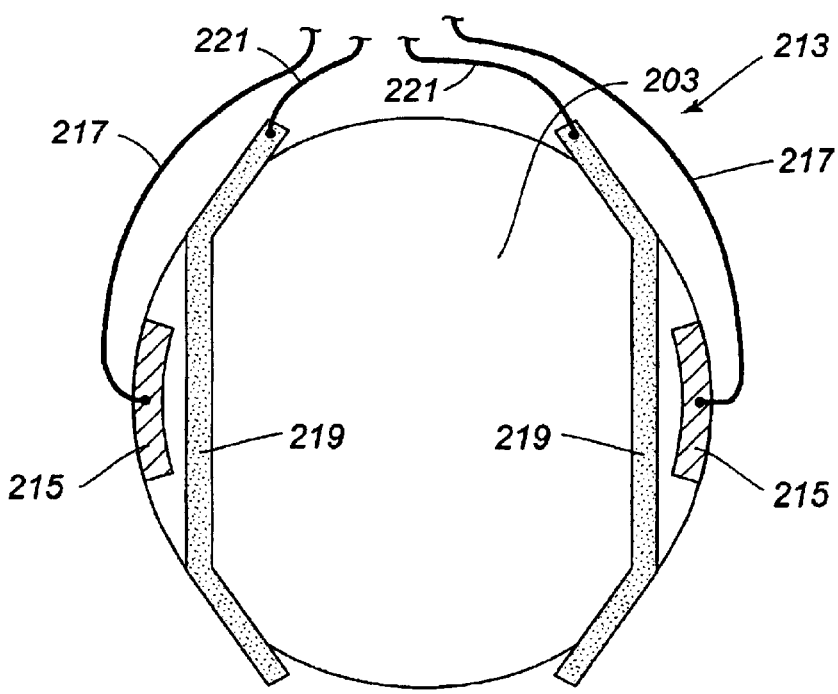
(b)

Fig.18
(a)
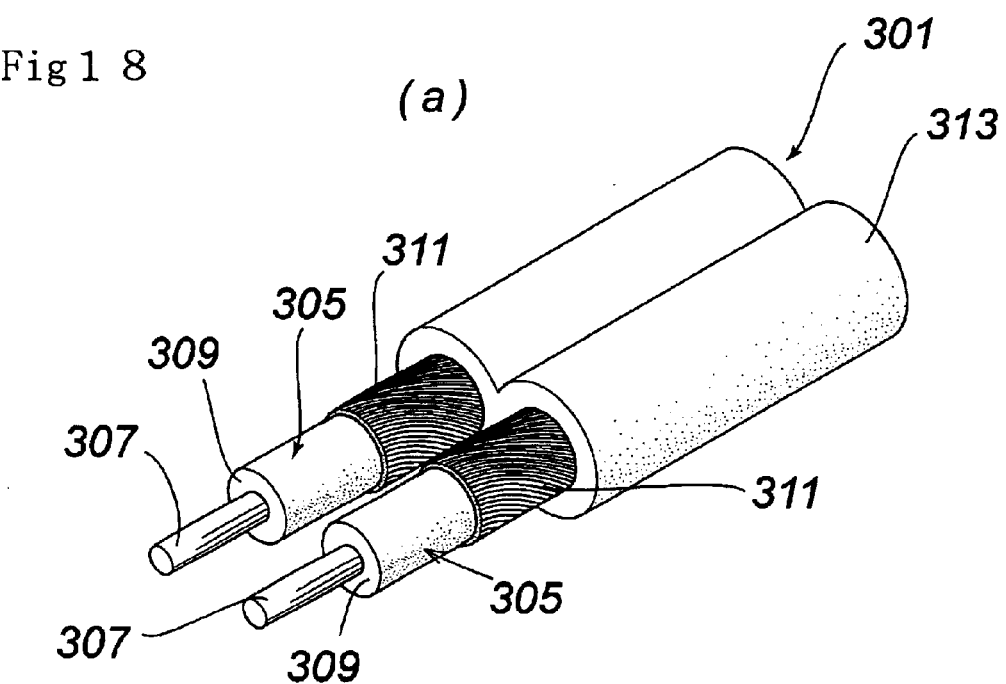
(b)
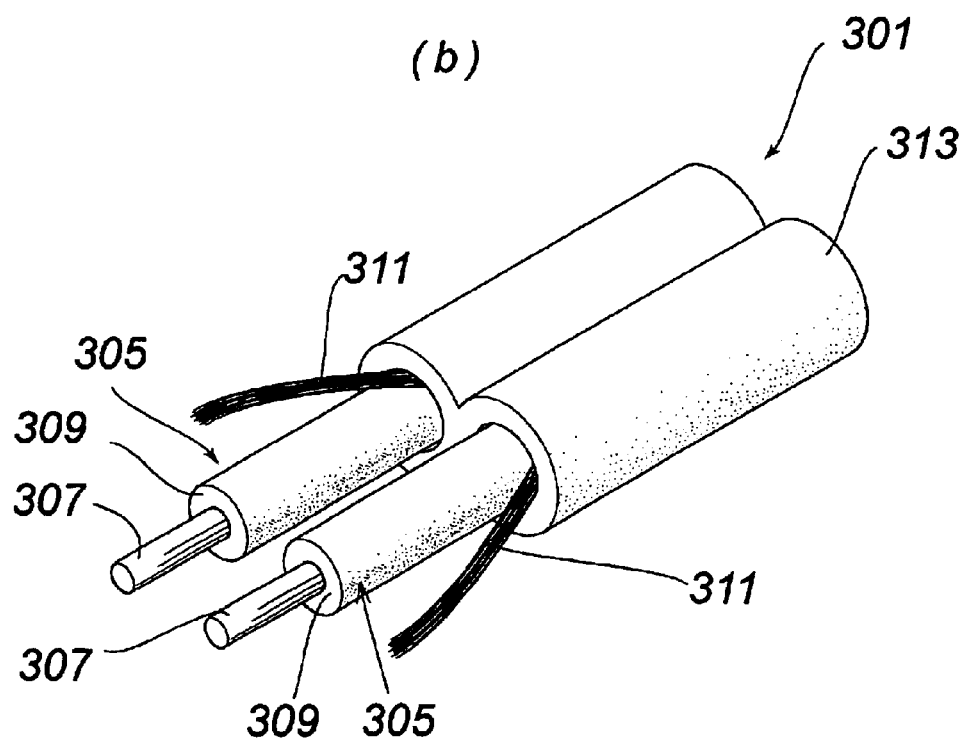

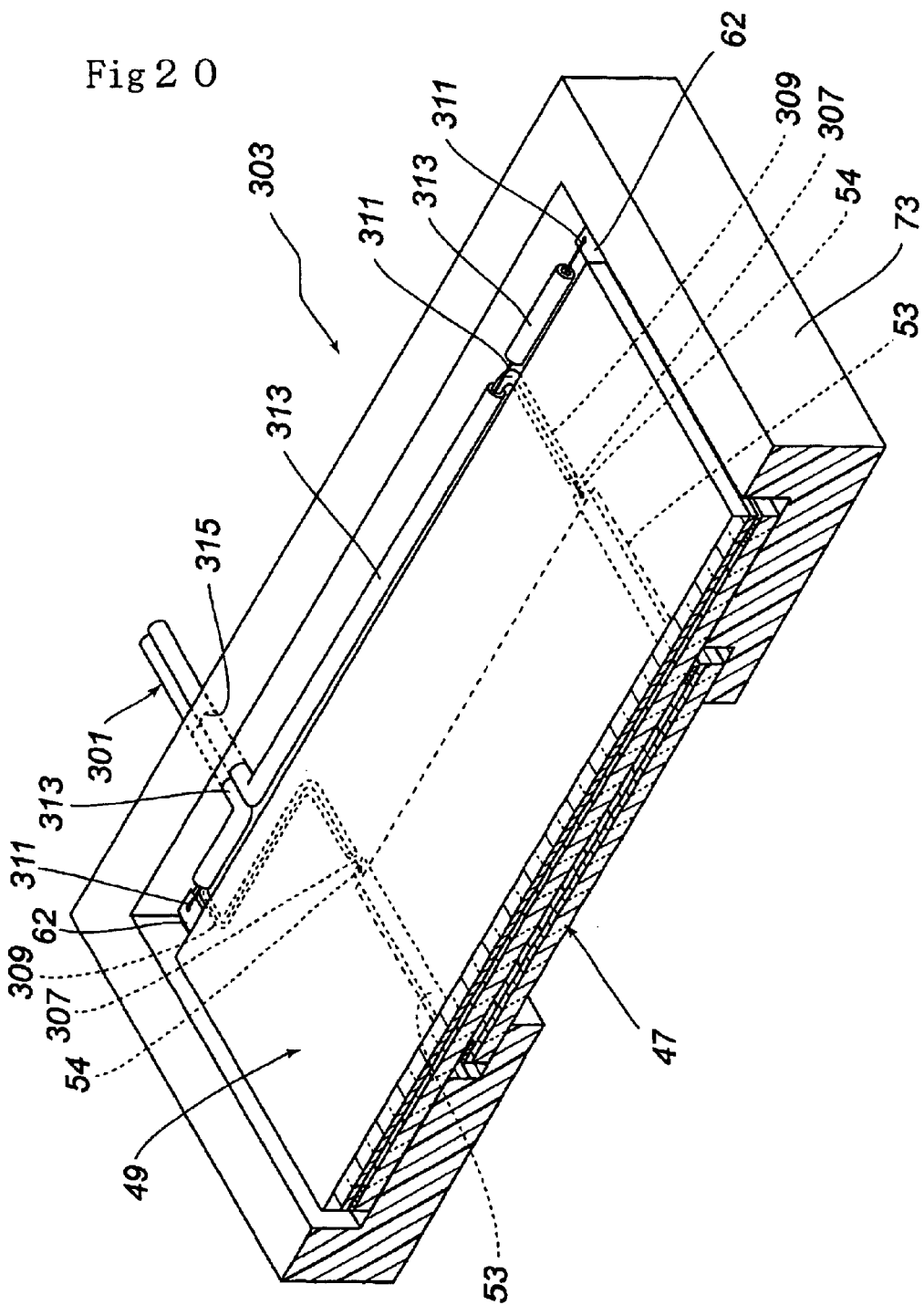

TRANSPARENT FACE TEMPERATURE SENSOR AND TRANSPARENT FACE TEMPERATURE CONTROLLER

BACKGROUND OF THE INVENTION

1. Technical Field

The present invention relates to a transparent face temperature sensor and a transparent face temperature control apparatus. More particularly, the present invention relates to a transparent face temperature sensor adapted to control the temperature of a specimen or specimens laid thereon to a desired temperature and a transparent face temperature control apparatus including such sensor.

2. Description of the Prior Art

In the case of artificial insemination for breeding of a stock, it is often necessary to keep the temperature of the specimen such as sperm or ova to observe under the microscope. In order to satisfy such requirement, a heater for microscope had been provided. Some apparatus are recited in the Japanese patent application serial No. 6-113540 (Japanese patent No. 2835422) (1994), and Japanese utility model application serial No. 7-2714 (Japanese utility model No. 3016894) (1995).

Generally, the heater for microscope comprises a transparent plate for heater, transparent electrically conductive film deposited on the surface of the plate, for example, through deposition methods, electrodes electrically connected to the film, a transparent protective plate spaced away by a given distance from the plate, a body of a transparent insulating material such as silicone for filling the space defined between the plates, a thermocouple as a temperature sensor in which the temperature measuring junction of which is disposed between the plates, and a housing bearing the outer peripheral edge of the plates.

If it is intended to observe or examine the specimen, the heater for microscope is at first attached on the stage of the microscope, the specimen laid over the slide glass is then placed on the heater, and energizing the film to generate heat energy to warm the specimen. The current to be delivered to the heater can be controlled on the basis of the temperature detected through the thermocouple.

Various types of the heaters are available. The types of the heaters depend on the kind of microscope (e. g. an inverted microscope, an erecting microscope, or a stereomicroscope, etc.), and/or the structure (shape) of the stages of the microscopes.

The above described heater for microscope is required to keep the specimen at predetermined temperatures for all types, since this is the performance required for the heater for microscope.

The temperature-measuring junctions of the thermocouple or sensor are disposed on the end portions of the plate for heater in order not to interfere with the observation. The apparatus of this arrangement, however, tend to heat excessively on the center of the plate. Thus the temperature detected by the thermocouple is often lower than that of the central portion. In this connection the control of the temperature on the basis of the information obtained through the thermocouple may lead to the overshooting of the temperature of the central portion relative to that set.

The problem of overshooting is common with the apparatus in which the portion to be sensed in its temperature has a predetermined surface area and the temperature sensor should be insured not to interfere with the observation.

SUMMARY OF THE INVENTION

An object of the present invention is to solve the above-mentioned problem of the prior art. Accordingly the object of the present invention is to provide a transparent temperature sensor, which can measure the transparent surface accurately without interfering the observation therethrough.

Another object of the present invention is to provide a transparent face temperature control apparatus, which can keep the temperature of the transparent surface at a constant one.

Yet another object of the present invention is to provide a temperature control apparatus suitable for observing a heated specimen or specimens through microscope.

These and other objects are achieved by the prevent inventions.

According to a first aspect of the invention, there is provided a transparent face temperature sensor for measuring temperature comprising: a transparent insulating substrate for the sensor, a transparent electrically conductive film for the sensor provided on at least either one of the surfaces of the substrate, a pair of terminals for the sensor spaced each other in a predetermined distance and electrically connected to the film, and a pair of wires, respectively, electrically connected at their one end to the pair of terminals; wherein the temperature is measured on the basis of the variation of the current or voltage generated by the variation of the temperature of the film.

According to a first aspect of the invention, there is provided the temperature sensor according to claim 1, further including a transparent insulating cover for protecting the transparent sensor film.

According to a third aspect of the invention, there is provided the temperature sensor according to claim 1 or 2, in which said pair of terminals are disposed in diametrically opposite positions on the film.

According to a fourth aspect of the invention, there is provided the temperature sensor according to any one of claims 1 to 3, in which the wires are made of electrically conductive materials of different kinds, together combining a thermocouple, the one end of wires are connected to each other to define a temperature measuring junction of the thermocouple, whereby the temperature of the film is measured by detecting the thermo-electric power generated between the wires.

According to a fifth aspect of the invention, there is provided the temperature sensor according to any one of claims 1 to 3, characterized in that the film of the sensor is made of a resistive material which varies the degree of resistance in accordance with the variation of the temperature thereof, the temperature of the film can be measured on the basis of the variation of the resistance of the film.

According to a sixth aspect of the invention, there is provided a transparent face temperature control apparatus comprising: a transparent face heater on which the temperature sensor according to any one of claims 1 to 3 is mounted, the heater comprising; a transparent insulating substrate for the heater, a transparent electrically conductive film for the heater provided on at least either one of the surfaces of the substrate, and a pair of terminals for the heater spaced each other in a predetermined distance and electrically connected to the film; wherein the amount of electric current delivered to the heater is controlled on the basis of temperature information obtained from the sensor.

According to a seventh aspect of the invention, there is provided the temperature control apparatus according to claim 6, in which that each of said terminals for the sensor includes a portion extending beyond the outer periphery of the substrate, and a pair of wires are electrically connected, respectively, at their one ends to the extending portion of the terminals.

According to a eighth aspect of the invention, there is provided the temperature control apparatus according to claim 6 or 7, in which said substrate for the heater is used also as the substrate for the sensor.

According to a ninth aspect of the invention, there is provided the temperature control apparatus according to claim 8, in which said heater film is used also as the sensor film.

According to a tenth aspect, there is provided the temperature control apparatus according to any one of claims 6 to 9, in which the wires are made of electrically conductive materials of different kinds, together combining a thermocouple, the one end of wires are connected to each other to define a temperature measuring junction of the thermocouple, whereby the temperature of the film is measured by detecting the thermo-electric power generated between the wires.

According to a 11th aspect of the invention, there is provided the temperature control apparatus according to any one of claims 6 to 8, in which the film of the sensor is made of a resistive material which varies the degree of resistance in accordance with the variation of the temperature thereof, and the sensor obtains temperature information from resistance variation of the film.

According to a 12th aspect of the invention, there is provided the temperature control apparatus according to claim 9, in which the film of the sensor is made of a resistive material which varies the degree of resistance in accordance with the variation of the temperature thereof, and the sensor obtains temperature information from resistance variation of the film.

According to a 13th aspect of the invention, there is provided the temperature control apparatus according to claim 12, in which the sensor is connected to the power supply through the wires of the sensor, wherein the electric current for heating is delivered to the sensor film through the wires.

According to a 14th aspect of the invention, there is provided the temperature control apparatus according to any one of claims 6 to 13, in which the apparatus is used for microscopic observation and the transparent face heater and the transparent face temperature sensor, together combine a transparent plate assembly, which will be mounted on the stage of microscope.

BRIEF DESCRIPTION OF THE DRAWINGS

Further feature of the present invention will become apparent to those skilled in the art to which the present invention relates from reading the following specification with reference to the accompanying drawings, in which:

FIG. 6(a) is a plan view showing another transparent face temperature sensor, and (b) is a cross sectional view of the (a) sensor;

FIG. 7(a) is a plan view showing a yet other transparent face temperature sensor, and (b) is a cross sectional view of the (a) sensor;

FIGS. 14(a) and (b) are, respectively, plan views showing transparent plate assemblies of a fifth embodiment;

FIG. 15(a) and (b) are, respectively, plan views showing transparent plate assemblies, different from the FIG. 14 ones;

FIG. 18 is a perspective view showing a cable to be connected to the transparent plate assembly of the temperature control apparatus for microscopic observation of the seventh embodiment;

FIG. 20 is a partial perspective view showing the transparent plate assembly to which the FIG. 19 cable is connected;

FIG. 21 is a plan view showing a transparent face temperature sensor of a transparent plate assembly of a temperature control apparatus for microscopic observation of an eighth embodiment according to the invention;

FIG. 22 is a plan view showing another type transparent face temperature sensor, different from that of the eighth embodiment;

FIG. 23 is a plan view showing a transparent face temperature sensor of a transparent plate assembly of a temperature control apparatus for microscopic observation of a ninth embodiment according to the invention; and FIG. 24 is a plan view showing a transparent face heater of the transparent plate assembly of the temperature control apparatus for microscopic observation of the ninth embodiment according to the invention.

DETAILED DESCRIPTION OF THE INVENTION

Figure 1:
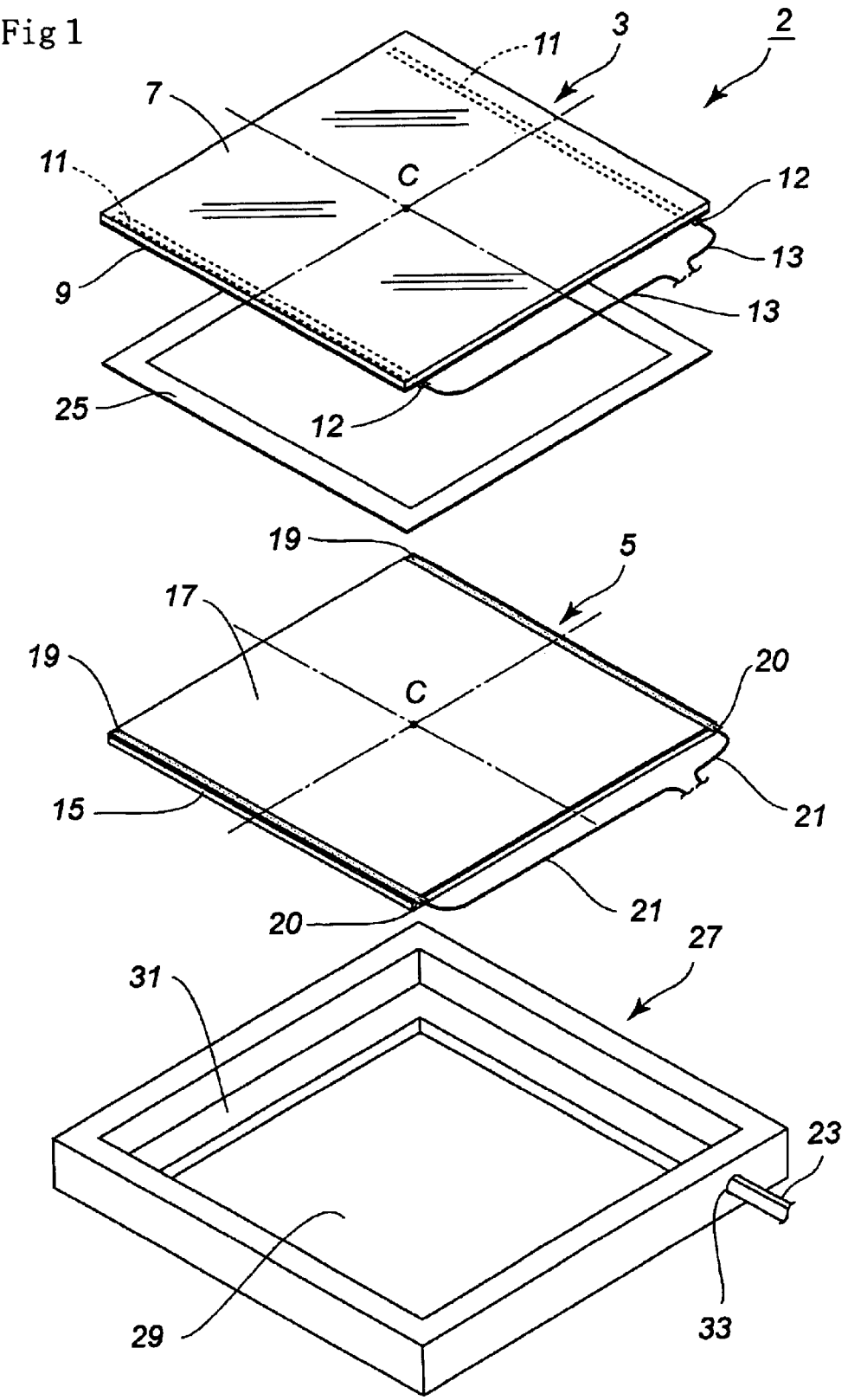
FIG. 1 is a exploded perspective view showing a transparent plate assembly of a temperature control apparatus for microscopic observation of a first embodiment according to the invention.
Figure 2:
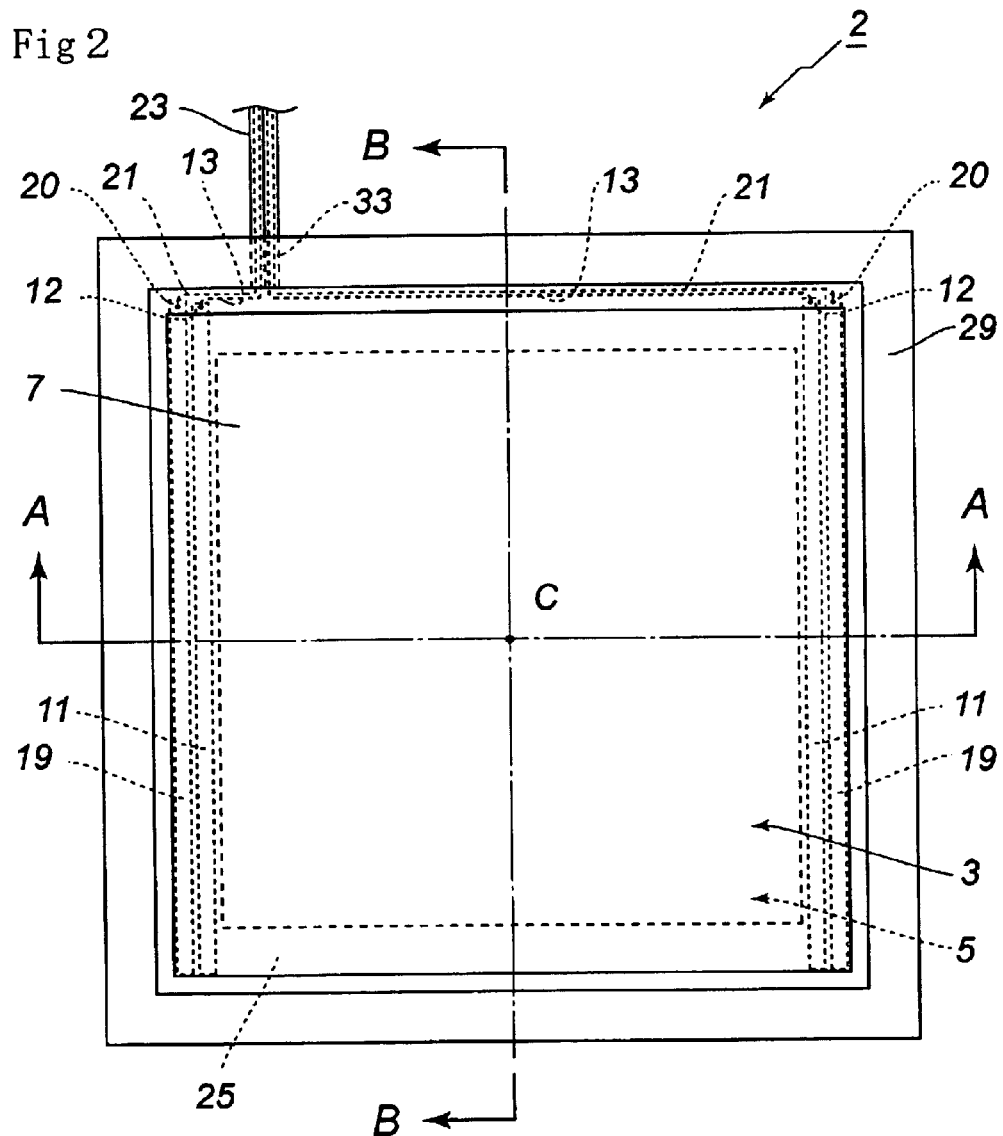
FIG. 2 is a plan view showing the transparent plate assembly of the first embodiment.
Figure 3:
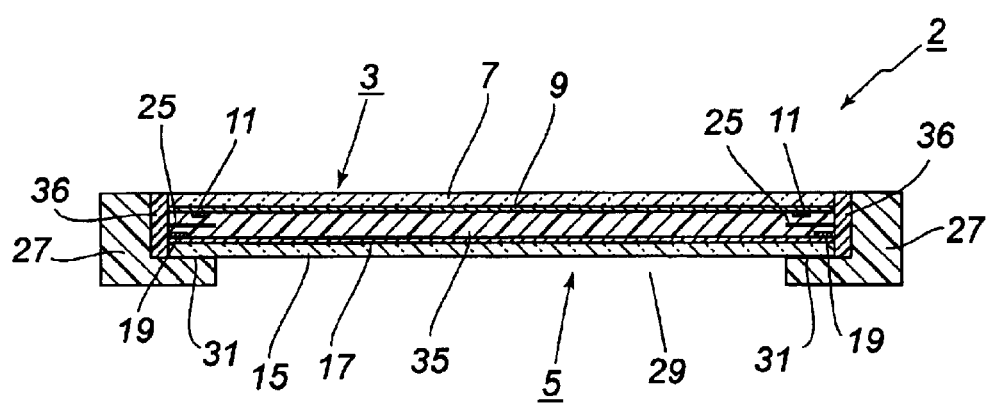
FIG. 3 is a cross sectional view taken along the line A—A of FIG. 2.
Figure 4:
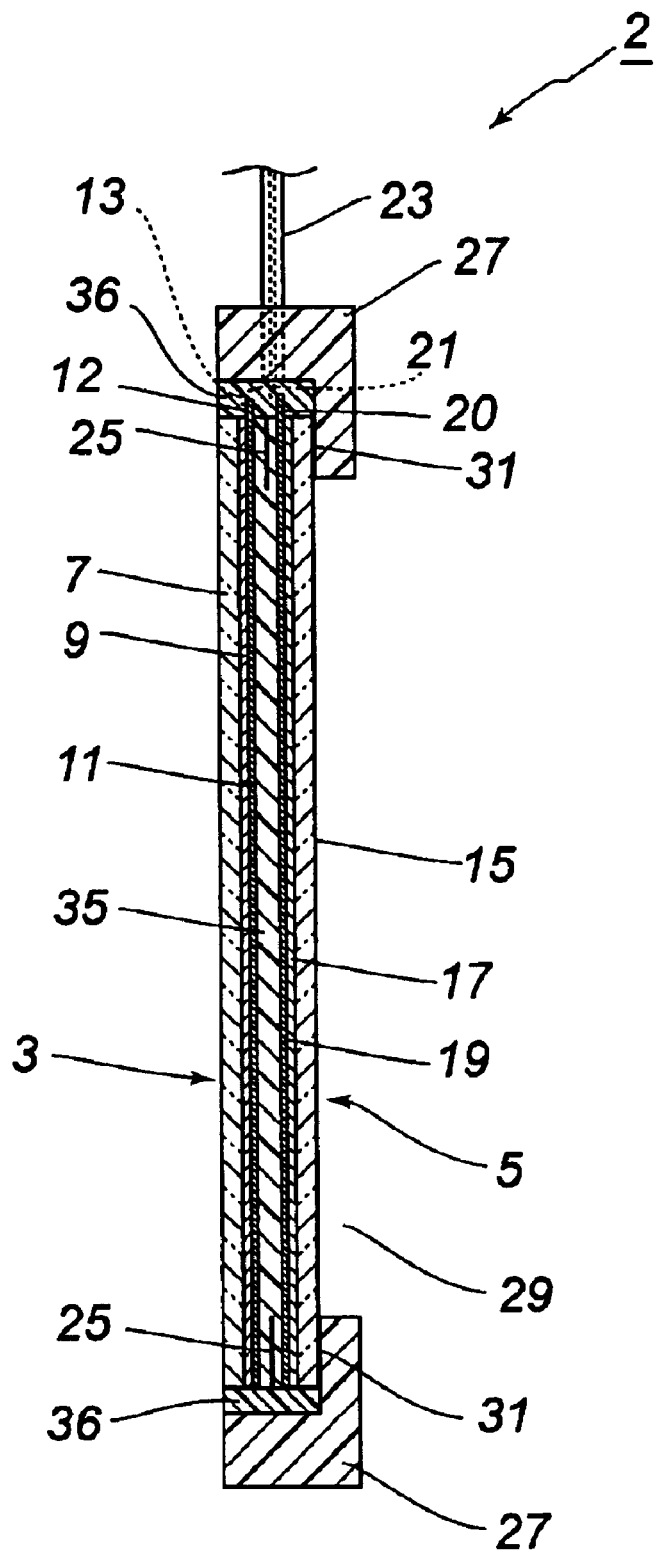
FIG. 4 is a cross sectional view taken along the line B—B of FIG. 2.

A temperature control apparatus 1 for microscopic observation of the first embodiment according to the invention will now be described with reference to FIGS. 1–5.

The temperature control apparatus 1 for microscopic observation comprises a transparent plate assembly 2, a control unit 4, and a cable 23 connecting the assembly 2 with the unit 4.

The arrangement of structural elements of the transparent plate assembly 2 such as a transparent face temperature sensor 3 and a transparent face heater 5 will at first be described.

With respect to the structure of the transparent face temperature sensor 3, the sensor 3 includes a transparent insulating substrate 7 of transparent glass material. The substrate 7 is covered over the entire surface thereof with a transparent temperature sensor film 9 of tin oxide film is formed through a vacuum deposition method.

A reference numeral 11 designates a pair of terminals for the temperature sensor. The terminals 11 are made of long and narrow or band-shaped copper foil and separated away from each other. Each terminal 11 is electrically connected onto the surface of the film 9, and positioned slightly inwardly from the edge thereof. The terminals 11 are positioned on the diametrically opposite side of the center C of the film 9. The one of the ends of each terminal 11 extends outwardly beyond the edge of the substrate 7.

A reference numeral 13 designates a pair of electrically conductive wires for the temperature sensor. The one end of each wire 13 is electrically connected onto the upper surface of the portion 12 extended outwardly from the terminal 11. In other words, the portion 12 extended outwardly from the terminal 11 is adapted to be used for connecting the wire. One of the wires is made of copper and the other constantan. The metal materials constitute a thermocouple. A transparent insulating cover for protecting the sensor will be referred later.

The ends of the wires 13 connected to the terminals 11 define a temperature-measuring junction.

The arrangement of the transparent face heater 5 will be now described.

A reference numeral 15 designates a transparent insulating substrate of glass material for the heater. One of the surfaces of the substrate 15 is covered over the entire surface thereof with an electrically conductive transparent heater film 17 of resistive heating material, $SiO_2$-indium alloy. The film 17 is made by a vacuum deposition method.

A reference numeral 19 designates a pair of long and narrow or band-shaped electrodes of copper foil for the heater. The electrodes 19 are spaced away from each other. The electrodes 19 for the heater are mounted on the electrically conductive transparent heater film 17 along the edges thereof so as to be electrically connected with the heater film 17. The one of the ends of each electrode 19 extends outwardly beyond the edge. of the substrate 15.

A reference numeral 21 designates a pair of electrically conductive wires for the heater. The one of the ends of each wire 21 is electrically connected onto the lower surface of the electrode 19 at the portion 20 extended outwardly therefrom. In other words, the portion 20 extended outwardly from the electrode 19 is adapted to be used for connecting the wire 21. Each of the pair of wires 21, 21 is made of copper, which exhibits good conductivity.

A reference numeral 25 designates an insulating sheet of paper in the form of a rectangular frame.

A reference numeral 27 designates a housing of plastic material in the form of a rectangular frame including an aperture 29 of rectangular configuration and a bearing portion 31 protruding inwardly to the center of the aperture 29 from the inner surface of the housing.

The housing 27 has a hole 33 formed for threading a cable through the side surface thereof.

The transparent plate assembly 2 can be fabricated by superposing the transparent face heater 5, the insulating sheet 25, and the transparent face temperature sensor 3 sequentially within the aperture 29 of the housing 27. The surface of the substrate 15 for transparent face heater 5, on which the electrically conductive transparent heater film 17 is not provided, faces the bearing portion 31. In the assembled or fabricated condition, the transparent temperature sensor film 9 of the transparent face temperature sensor 3 and the electrically conductive transparent heater film 17 of the transparent face heater 5 are arranged to be opposite with each other.

The pair of terminals 11 for the sensor 3 and the pair of electrodes 19 are adapted to be disposed so as not to be overlapped with each other.

The sensor 3 and the heater 5 are spaced and bonded in one piece with each other through the transparent insulating material 35 such as silicone resin filling the space defined therebetween. Silicone is a preferable material because of its fluidity and adhesive property. The pair of terminals 11 and the pair of electrodes 19 are isolated reliably with each other due to existence of the insulating sheet 25 interposed therebetween.

Further, in the above-described embodiment, the transparent insulating material 35 also serves as a transparent insulating protective cover for protecting the temperature-sensing portion of the transparent face temperature sensor 3.

The space between the outer periphery of the transparent face temperature sensor 3 and the transparent face heater 5, and the housing 27 is filled with an insulating securing material 36 having adhesive property of black silicone resin so that the outer peripheries are bonded securely to the housing 27. In other words, the outer periphery is held by the housing 27. The pair of electrically conductive wires 13 for the sensor and the pair of electrically conductive wires 21 for the heater are isolated within the housing 27 due to existence of the black insulating material 36.

The cable 23 have been withdrawn from the hole 33.

Please be understood, in FIGS. 1–4, the transparent insulating temperature sensor film 9 is drawn to be thick relative to the transparent insulating substrate 7 for the sensor, and the electrically conductive transparent heater film 17 is drawn to be thick relative to the transparent insulating substrate 15, for the convenience of apprehension. Further, the clearance defined between the outer edges of the transparent insulating substrate 7 for the sensor and the transparent insulating substrate 15 for the heater and the inner surface of the housing 27 is also drawn enlarged relative to that defined in reality. These modification would also be done in the drawings referred hereinbelow.

The pair of electrically conductive wires 13 for the sensor and the pair of electrically conductive wires 21 for the heater are bundled together to make the cable 23. The cable 23 includes a pair of cords arranged in parallel with each other and enveloped within a sheath. Each cord comprises one electrically conductive wire 13 enveloped within an insulation and a plurality of thin wires derived from one electrically conductive wire 21 wound around the insulation respectively. Thus the cable has a cross-section of "∞".

Figure 5:
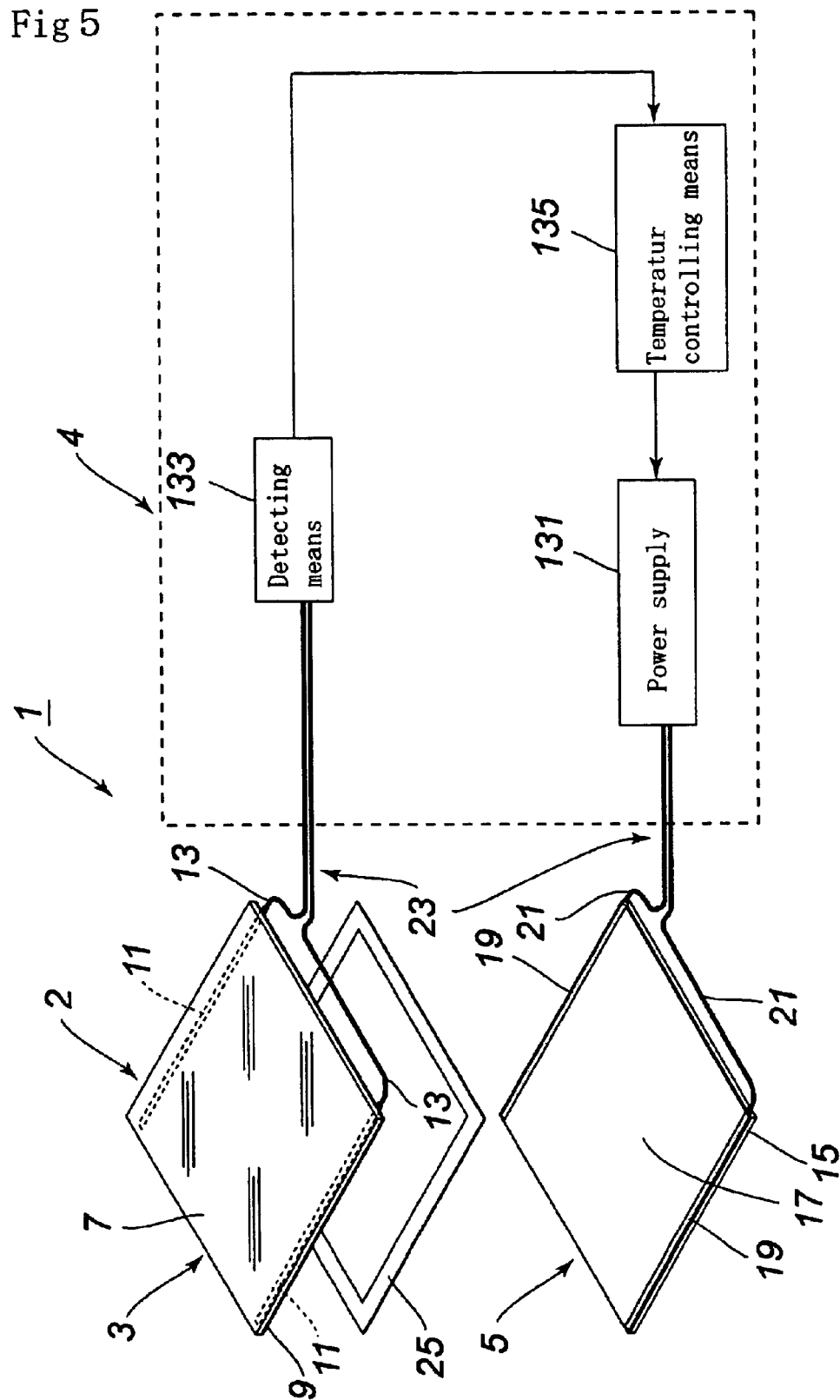
FIG. 5 is a diagram showing the temperature control apparatus of the first embodiment.

The structural relationship between the assembly and the control unit 4 will now be described with reference to the diagram of FIG. 5.

The other end of the cable 23 is connected to the box-shaped control unit 4. The other ends of the pair of electrically conductive wires 21 for the heater are connected to the power supply 131 in order to provide the electric current from the power supply 131 to the heater film 17.

The reference junction of the pair of wires 13 of the transparent face temperature sensor 3 are made in a detecting means 133. The detecting means 133 is adapted to detect the temperature on the basis of the thermo-electric power generated by the difference in temperature between the measuring junctions and the reference junctions. The predetermined target temperature is set in the temperature controlling means 135. If the difference between the measured temperature and the target temperature is detected, the control unit 4 sends a command to eliminate or decrease the difference to zero to the power supply 131. Then the power supply 131 controls in accordance with the command current to be delivered to the heater film 17 by use of switching means (not shown). The transparent electrically conductive heater film 17 can thus be held in the desired temperature.

When using the temperature control apparatus 1 for microscopic observation, the transparent plate assembly 2 is mounted on the stage of a microscope, then the target temperature of the specimen or the object to be observed is set by the temperature controlling means 135 of the control unit 4, and the assembly 2 is energized to increase the temperature thereof. Observation of the specimen can then be effected by disposing a slide glass with the specimen on the surface of the transparent insulating substrate 7 for the sensor. On one surface of the substrate 7, which has the transparent electrically conductive temperature sensor film 9 formed thereon is disposed the slide glass.

In the course of observation, a command on the basis of the temperature information from the transparent face sensor 3 is delivered to the power supply 131 whereby the amount of thermal energy is controlled, of transparent electrically conductive heater film 17. Thus the specimen can be maintained in the desired temperature.

The pair of electrically conductive wires 13 defining a thermo-couple are connected electrically at their one end to the transparent electrically conductive temperature sensor film 9 on the positions separate substantially with each other. In other words, the temperature measuring junction defined between the ends of the opposite wire can be provided by the entire surface of the temperature sensor film 9. In this connection, the face temperature sensor 3 can detect the average temperature over the entire surface of the sensor film 9, thus the accuracy of the temperature information from the sensor 3 can be enhanced.

The pair of terminals 11 are not disposed between the transparent plate assembly 2 so that the thickness of the assembly 2 is reduced.

A transparent face temperature sensor 37 of another type is illustrated in FIG. 6. The sensor 37 is an alternative to the face temperature sensor 3 of the first embodiment.

A pair of tabs shaped terminals for the temperature sensor are designated by a reference numeral 39. The terminals 39 are disposed on the opposite edges of the transparent insulating substrate 7 at the central portion of the edge so as to alien with the central point C of the film 9. Each terminal 39 extends outwardly beyond the outer edge of the transparent insulating substrate 7.

Each of the electrically conductive wires 13 is connected at its one end to the extending portion 40 of the terminal 39 for the sensor.

A transparent face temperature sensor 41 of yet other type is illustrated in FIG. 7. The transparent face temperature sensor 41 is also an alternative to the transparent face temperature sensor 3 of the first embodiment.

A pair of tab shaped terminals for the temperature sensor are designated by the reference numeral 43. The terminals 43 are disposed on the opposite edges of the substrate 7 for the sensor at the end portion of the edge so as to alien diagonally with the central point C of the film 9. Each terminal 43 for a portion 44 extending outwardly beyond the outer edge of the transparent insulating substrate 7.

Each of the wires 13 for the sensor is connected at its one end to the extending portion 44 of the terminal 43.

Figure 8:
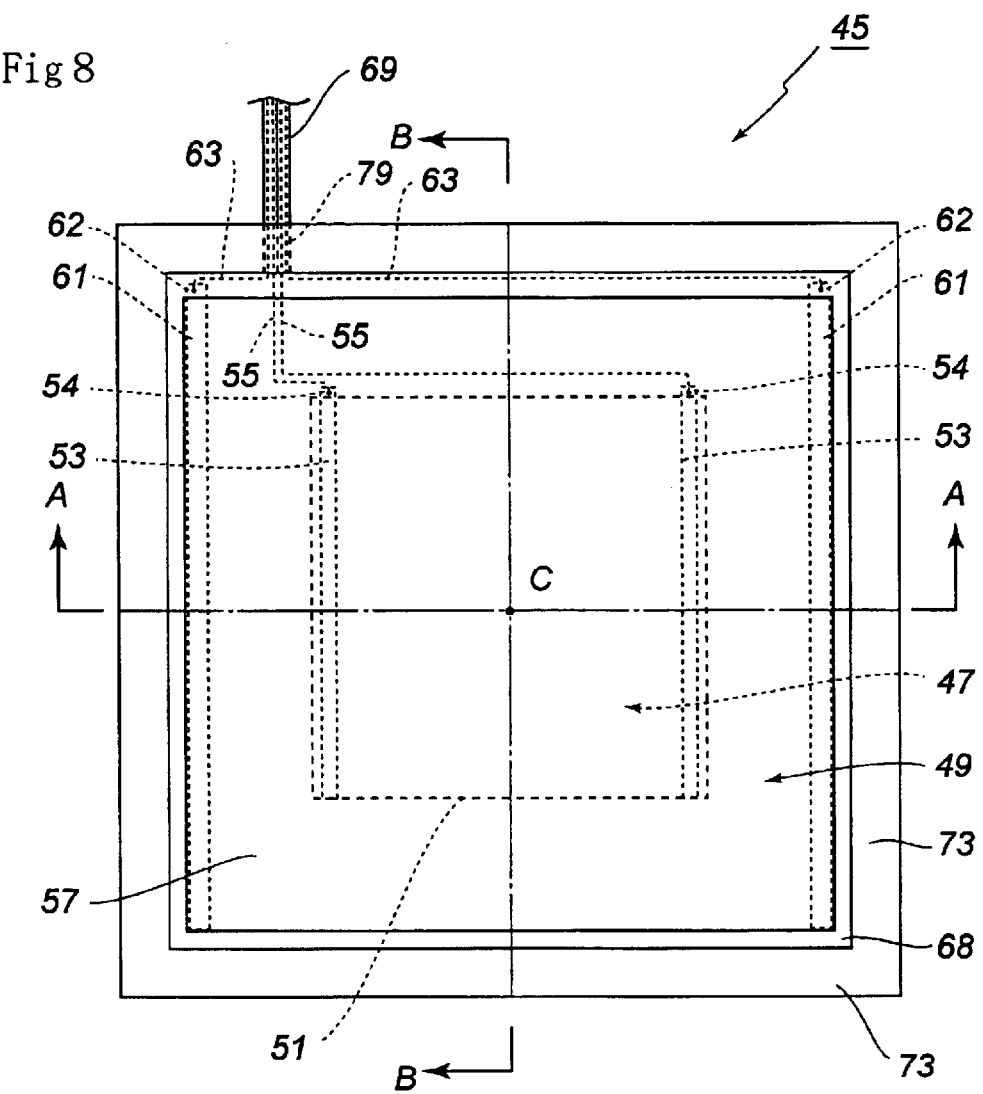
FIG. 8 is a plan view showing a transparent plate assembly of a temperature control apparatus for microscopic observation of a second embodiment according to the invention.
Figure 9:
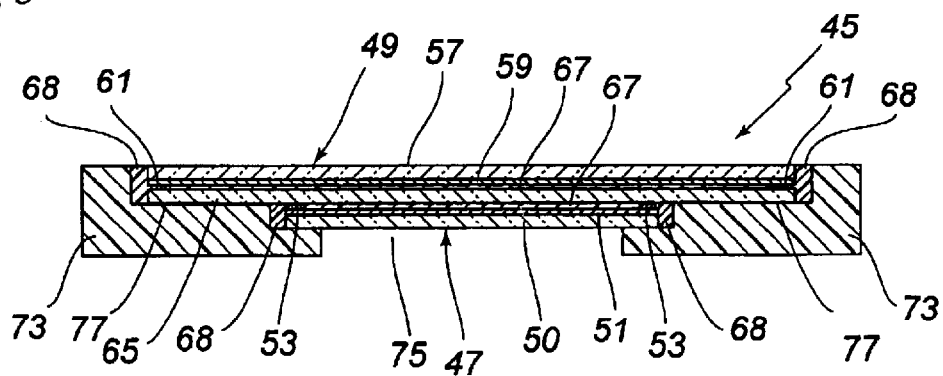
FIG. 9 is a cross sectional view taken along the line A—A of FIG. 8.
Figure 10:
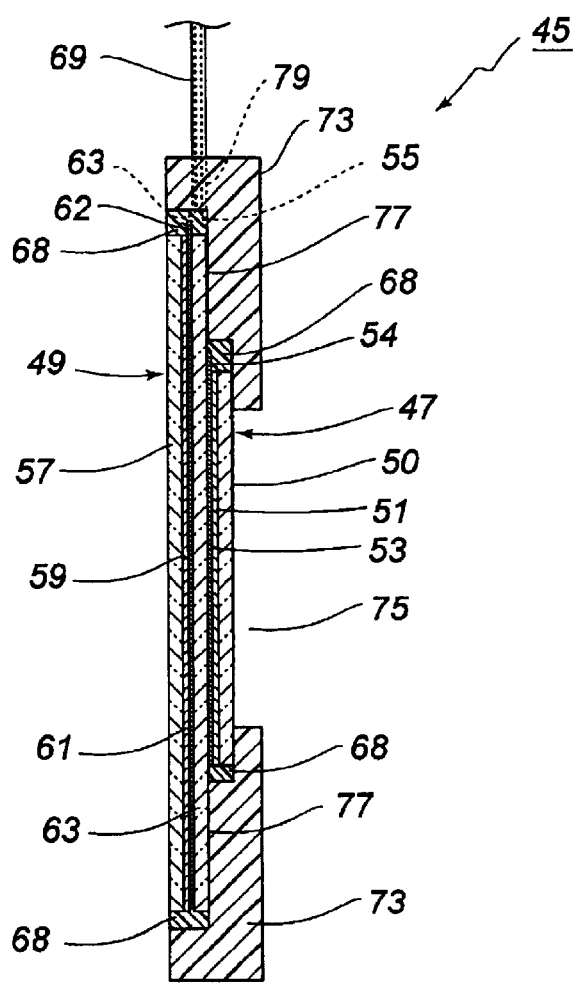
FIG. 10 is a cross sectional view taken along the line B—B of FIG. 8.

A transparent plate assembly 45 of the temperature control apparatus 1 for the observation through the microscope of the second embodiment according to the invention will now be described with reference to FIGS. 8–10.

At first, the arrangement of a transparent face temperature sensor 47 will be described.

A reference numeral 50 designates a transparent insulating substrate for the temperature sensor of plastic material. The substrate 50 is provided with a transparent electrically conductive temperature sensor film 51 over the entire surface of the one of its surfaces. The film 51 is deposited by a vacuum deposition method.

Those designated by the reference numerals 53 are a pair of terminals for the sensor of long and narrow or band-shaped copper foil separated with each other. Each terminal is electrically connected with the transparent electrically conductive temperature sensor film 51 along the edge thereof. As can be seen from the drawings, the pair of terminals 53 for the sensor are disposed on opposite sides of the substrate 50 with respect to the central point C. The one of the ends of each terminal 53 extends outwardly beyond the edge of the substrate 50.

Those designated by the reference numeral 55 are a pair electrically conductive wires for the temperature sensor. The one of the ends of each wire 55 is electrically connected onto the portion 54 extending outwardly from the terminal 53. In other words, the portion 54 extending outwardly from the terminal 53 is adapted to be used for connecting the wire. Each of the pair of wires 55 is made of copper and constantan respectively, thus can be obtained a thermo-couple including a measuring junctions defined by connecting them with the terminals 53.

A transparent insulating protective cover for protecting the temperature sensing portion of the transparent face temperature sensor will be described later.

The arrangement of the transparent face temperature heater 49 will now be described.

A reference numeral 57 designates a transparent insulating substrate of glass material for the heater. One of the surfaces of the substrate 57 is covered over the entire surface thereof with a electrically conductive transparent heater film 59 of $SiO_2$-indium alloy. The film 59 is formed by a vacuum deposition method. The substrate 57 for the heater is larger in its size than that of the substrate 50 for the sensor.

A reference numeral 61 designates a pair of long and narrow or band-shaped electrodes of copper foil for the heater spaced apart with each other. The electrodes 61 are mounted along the edges of the substrate 57, and are connected electrically to the heater film 59. The one of the ends of each electrode 61 extends outwardly beyond the edge of the substrate 57.

A reference numeral 63 designates a pair electrically conductive wires for the heater. The one of the ends of each wire 63 extended outwardly from the electrodes 61 is electrically connected to the portion 62. In other words, the portion 62 extended outwardly from the electrode 61 is adapted to be used for connecting the wires 63. Each of the pair of wires 63 is made of copper exhibiting good conductivity.

A reference numeral 65 designates an intermediate transparent insulating sheet of the same material and size of the transparent insulating substrate 57 for heater. The transparent electrically conductive heater film 59 and the pair of electrodes 61 are connected to the intermediate transparent insulating sheet 65, with a transparent insulating material 67 of flexible and adherent silicone resin being interposed therebetween.

The pair of wires 55 for the sensor and the pair of wires 63 for the heater are bundled together to make a cable 69 of the same structure as the cable 23 of the first embodiment. The cable 69 is connected to the control unit 4 of the arrangement of the first embodiment.

A reference numeral 73 designates a housing of plastic material in the form of a rectangular frame including an aperture 75 of rectangular configuration and a step shaped bearing portion 77 protruding inwardly toward the center of the aperture 75.

The side surface of the housing 73 is also provided with a hole 79 for threading the cable 69 therethrough.

The transparent face temperature sensor 47, the insulating sheet 65, and the transparent face heater 49 are laminated and contained within the housing 73 in this sequence so as to align each center C. One surface of the transparent insulating substrate 50 for the sensor on which the transparent electrically conductive temperature sensor film 51 is not formed, and the surface of the intermediate transparent insulating sheet 65 are overlapped on the bearing portion 77 of the housing 73.

The transparent insulating material 67 filling the space between the sensor 47 and the intermediate insulating sheet 65 electrically isolates the sensor 47 from the heater 49. Further, the sensor 47 and the heater 49 are securely connected with each other due to existence of the transparent insulating material 67.

In this embodiment, the transparent insulating protecting material 67 serves as a transparent insulating cover for protecting the sensor.

The space between the housing 73 and the outer periphery of the sensor 47 and the transparent face heater 49 is filled with the insulating securing material 68 having adhesive property of black silicone resin. The outer periphery of the sensor 47 and the transparent face heater 49 are securely connected to the housing 73 through the insulating securing material 68. Thus the outer periphery of the sensor 47 and the heater 49 are held by the housing 73.

The cable 69 have been withdrawn from the hole 79.

Upon using the temperature control apparatus of this embodiment, the transparent plate assembly 45 is mounted on the stage of a microscope with facing upwardly the surface of the transparent insulating substrate 57 for the heater on which the transparent electrically conductive heater film 59 is not provided, then the temperature control apparatus of this embodiment can be used in the same manner as that of the temperature control apparatus 1 of the first embodiment.

The transparent face temperature sensor 47 detects the average temperature over the transparent electrically conductive temperature sensor film 51 in the same manner as that of the first embodiment. In this connection, the accuracy of the information on the temperature to be derived is enhanced.

The surface area of the transparent insulating substrate 50 for temperature sensor is wide enough to put a plurality of slide glasses thereon. Thus a plurality of specimen can be warmed preliminary to observation.

Figure 11:
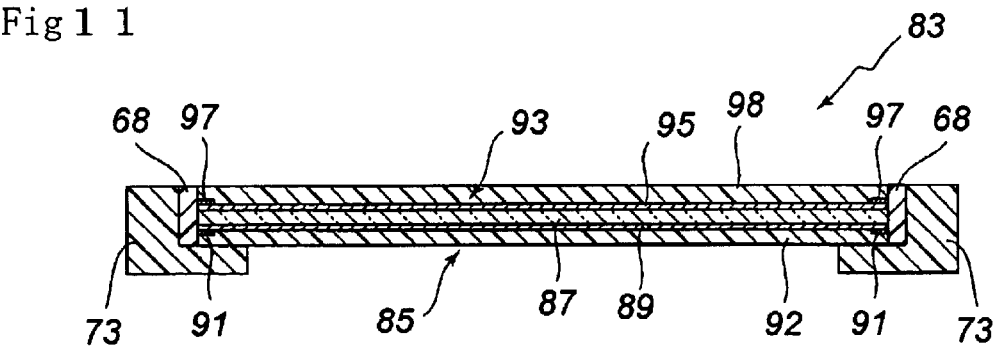
FIG. 11 is a cross sectional view showing a transparent plate assembly of a temperature control apparatus for microscopic observation of a third embodiment according to the invention.

The third embodiment of a transparent plate assembly 83 of the apparatus for the observation through the microscope will now be described with reference to FIG. 11.

The transparent plate assembly 83 of this embodiment is of one plate type in which a transparent face temperature sensor 85 and a transparent face heater 93 are provided on the opposite surfaces of a common substrate.

The transparent face temperature sensor 85 includes a transparent insulating substrate 87 of transparent glass material. The one side of the substrate 87 is provided with a transparent electrically conductive temperature sensor film 89 of tin oxide by a vacuum deposition method.

A reference numerals 91 designates a pair of terminals for the temperature sensor of long and narrow or band-shaped copper foil separated with each other. The arrangement of each terminal 91 is substantially identical to the of the terminals 11 except for the fact that the terminal 91 is provided along the edge of the transparent insulating substrate 87 for the temperature sensor. The transparent electrically conductive temperature sensor film 89 and the pair of terminals 91 are covered with a transparent insulating cover 92 for protecting the temperature sensing portion.

The transparent face heater 93 also uses the transparent insulating substrate 87 for the sensor as a transparent insulating substrate for heater. The transparent insulating substrate 87 for the sensor is provided over the other surface with a transparent electrically conductive heater film 95 of $SnO_2$-indium alloy by a vacuum deposition method.

A reference numerals 97 designates a pair of terminals for the heater of long and narrow or band-shaped copper foil. Each terminal 97 are arranged in the same manner as that of the terminals 19 of the first embodiment.

The heater film 95 and the pair of electrodes 97, 97 are covered with a transparent insulating cover 98 for the heater.

The other structural features of the apparatus are the same as those of the transparent plate assembly 2 of the temperature control apparatus 1 for microscopic observation of the first embodiment according to the invention.

The transparent plate assembly 83 of this embodiment can reduce the distance from the light source to the specimen because the thickness of the assembly 83 is relatively thin.

A transparent plate assembly 99 of the fourth embodiment according to the invention for the temperature control apparatus for microscopic observation will now be described with reference to FIG. 12. The plate assembly 99 includes a circular transparent insulating substrate 101 for the temperature sensor and a circular transparent insulating substrate 103 for the heater. Thus a transparent electrically conductive temperature sensing film 105 and a transparent electrically conductive heater film 107 are also of circular configuration. A pair of arc-shaped terminals 109 for the temperature sensor are provided on one surface of the substrate 101 for the temperature sensor along the edge thereof with spacing a little from the edge. A pair of arc-shaped terminals 111 for the heater are provided on one surface of the transparent insulating substrate 103 along the edge thereof with spacing a little therefrom. Of course, the insulating sheet 113 and the hole 115 therethrough, and the housing 117 and the hole 119 therethrough are also circular configuration.

However, the arrangement of the transparent plate assembly of the fourth embodiment is substantially identical with that of the first embodiment except for the features on the shape as mentioned above. In this connection, the same parts are designated by the same reference numeral and the explanations therefor are omitted to avoid the duplication.

Figure 12:
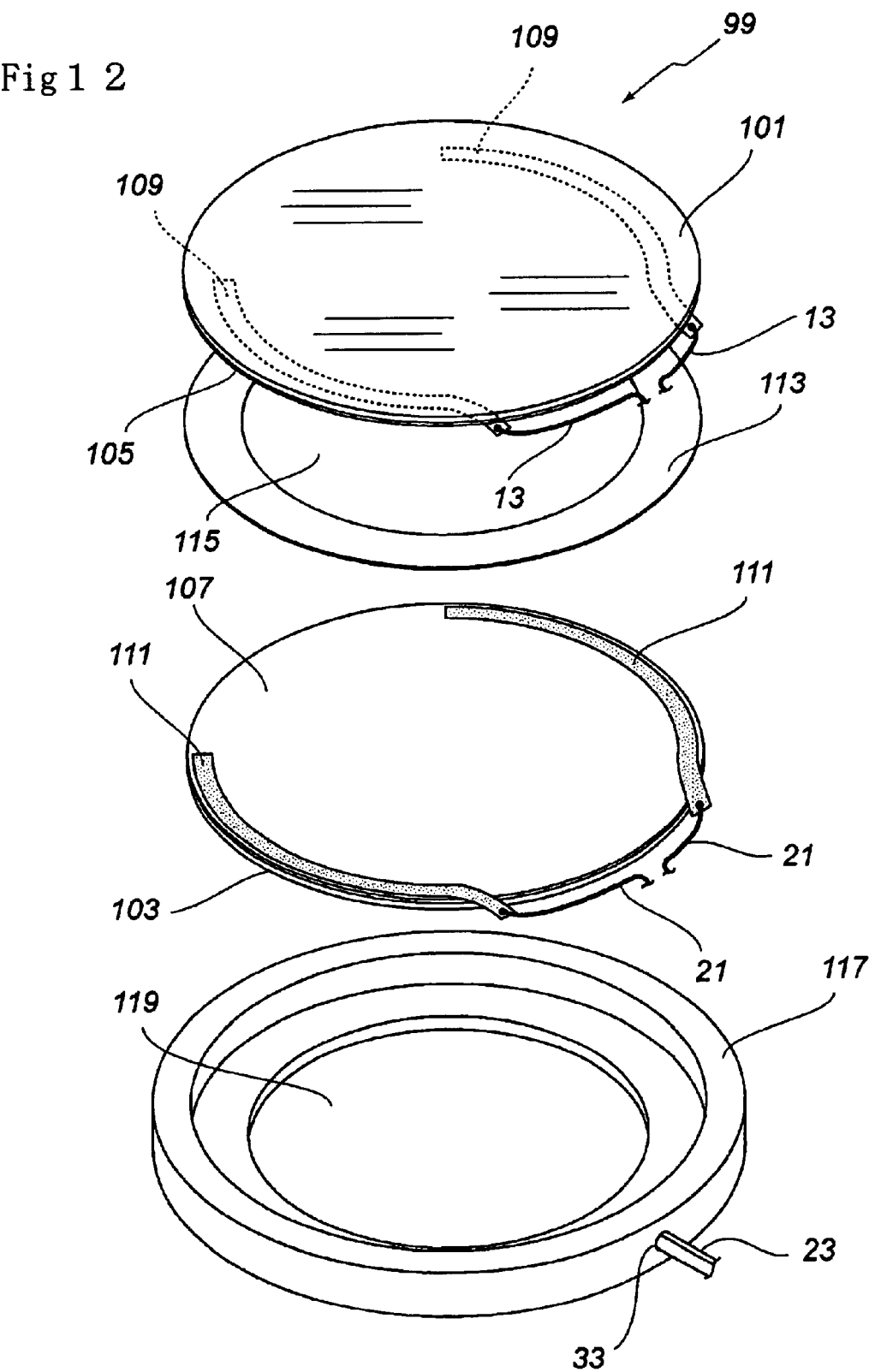
FIG. 12 is an exploded perspective view showing a transparent plate assembly of a temperature control apparatus for microscopic observation of a fourth embodiment according to the invention.
Figure 13:
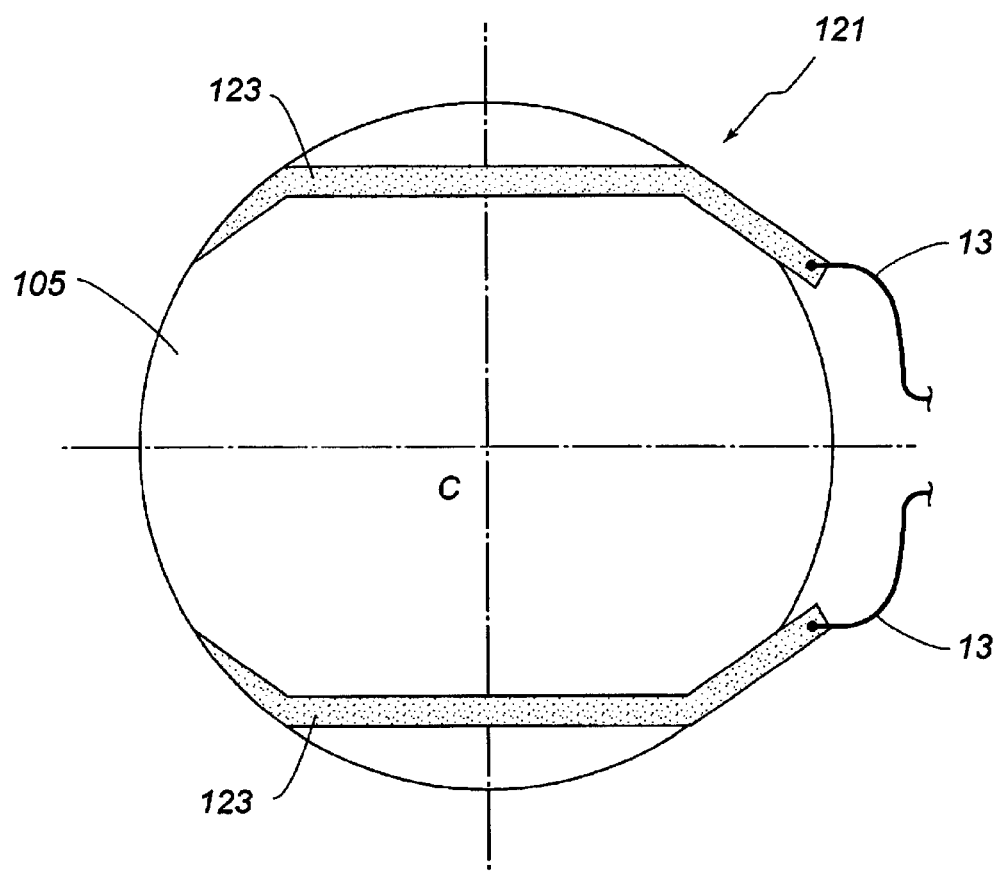
FIG. 13 is a plan view showing another transparent plate assembly, different from that of a fourth embodiment.

A transparent face temperature sensor 121 illustrated in FIG. 13 is different from that illustrated in FIG. 12. The transparent face temperature sensor 121 includes a pair of temperature sensing terminals 123 defined by rectilinear portions. In other words, the terminals 123 are different in their configuration from the terminal 109 for the heater. However, the arrangement of the transparent plate assembly of FIG. 13 is substantially identical with those of the transparent plate assembly 99 of the fourth embodiment except for the features on the shape as mentioned above. In this connection, the same parts are designated by the same reference numeral and the explanations therefore are omitted to avoid the duplication.

A transparent plate assembly 201 of the fifth embodiment according to the invention for microscopic observation will now be described with reference to FIGS. 14(a) and 14(b).

The plate assembly 201 of this embodiment is of one-plate type having only one transparent electrically conductive film served as a heater as well as a sensor. The plate shown in FIG. 14(a) and that shown in FIG. 14(b) are different in the positions of the sensor terminals.

The plate assembly includes a rectangular shaped transparent insulating substrate of glass material over the one surface of which is covered with a transparent electrically conductive film 203 of $SiO_2$-indium alloy deposited thereon by a vacuum deposition method.

A reference numerals 205 designates a pair of terminals of band-shaped copper foil connected to the film for sensing the temperature, and a reference numeral 207 designates a pair of wires connected to the terminals.

A reference numerals 209 designates a pair of electrodes of band-shaped copper foil connected to the heater film, and a reference numerals 211 designates a pair of wires connected to the electrodes.

The transparent electrically conductive film 203, the pair of terminals 205 for the heater, and the pair of electrodes 209 are covered with a transparent insulating material of silicone resin (which serves as a transparent insulating protecting cover), further on which a transparent insulating protecting plate is provided.

The plate assembly 201 is adapted to be connected to the control unit 4 of the first embodiment, and used in the same manner as in the first embodiment.

The film 203 of the plate assembly 201 is adapted to be used as a heater film as well as a sensor film. Thus the number of films to be provided is reduced to make the assembly thinner than the plate assembly 83 shown in FIG. 11. Further, the information on the temperature can be obtained directly from the film 203 served as a heater, so that the electrical insulation such as that provided in the first embodiment between the insulating film 9 of the heater 5 and the insulating film 17 of the temperature sensor 3 is not required. This will bring the structure of the plate assembly 201 simple and thus the manufacture thereof can be made easier.

A transparent plate assembly 213 of the type other than the fifth embodiment according to the invention will now be described with reference to FIGS. 15(a) and 15(b).

The general structure of the plate assembly 213 is substantially the same as the plate assembly 201 of the fifth embodiment except for the fact that the transparent insulating substrate is circular in its configuration.

A reference numerals 215 designates a pair of terminals of band-shaped copper foil connected to the film for sensing the temperature, and a reference numeral 217 designates are a pair of wires connected to the terminals 215.

A reference numerals 219 designates a pair of electrodes of band-shaped copper foil connected to the film for heating, and a reference numerals 221 designates a pair of wires connected to the electrodes 219.

A temperature control apparatus 223 for microscopic observation of the sixth embodiment according to the invention will now be described with reference to FIGS. 16 and 17.

The control apparatus 223 comprises a transparent plate assembly 225 and a control unit 227 connected with each other through electric cords 229.

At first the arrangement of the transparent plate assembly 225 will be described.

A reference numeral 231 designates a transparent insulating substrate of glass material. The substrate 231 is covered over the one surface thereof with a transparent electrically conductive film 235 of $SiO_2$-indium alloy. The film 235 is formed by a vacuum deposition method.

A reference numeral 237 designates a pair of spaced electrodes of band-shaped copper foil. Each electrode 237 is electrically connected to the film 235 along the edge of the film with separated slightly from the edge of the film. The electrodes 237 are disposed on opposite side of the film 235 with respect to the center C. The one end of each electrode 237 extends beyond the outer edge of the substrate 231.

A reference numeral 239 designates a pair of wires of copper material. The one end of each wire is connected to the back side of the extending portion 238 of the electrode 237. Thus the extending portion 238 is used for connecting the wire. The pair of wires 239 are made of copper material.

The wires 239 are bundled together to form an electric cable 241.

The reference numeral 243 is added to a transparent insulating protecting plate, and the reference numeral 245 is added to a housing. The housing 245 is formed of plastic material in the shape of rectangular frame including a rectangular aperture 247 and a bearing portion 249 protruding toward the center of the aperture of the housing. The housing 245 is also provided with a hole 251 for threading the cable 241 through the side surface of the housing.

Figure 16:
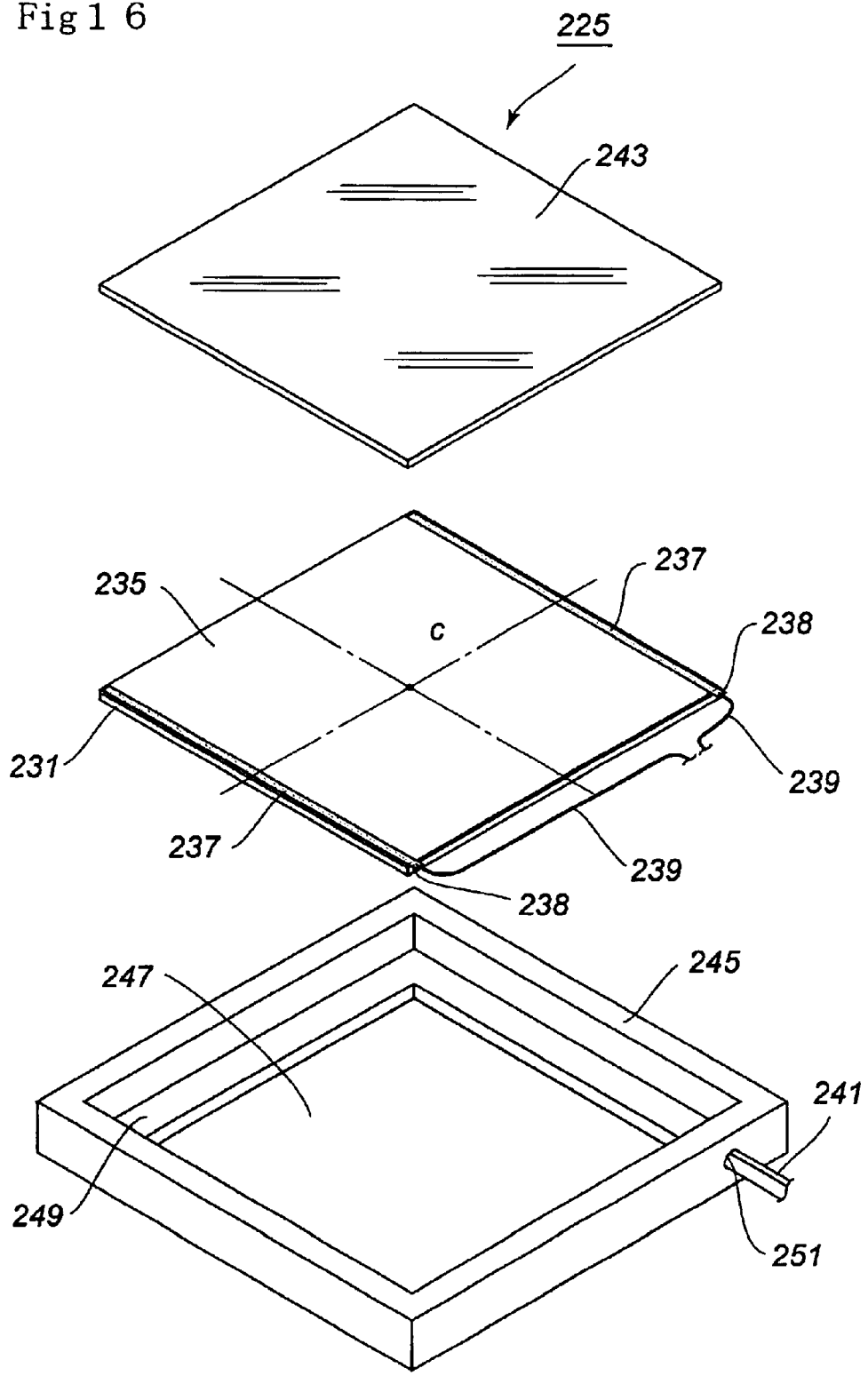
FIG. 16 is an exploded perspective view showing a transparent plate assembly of a temperature control apparatus for microscopic observation of a sixth embodiment according to the invention.
Figure 17:
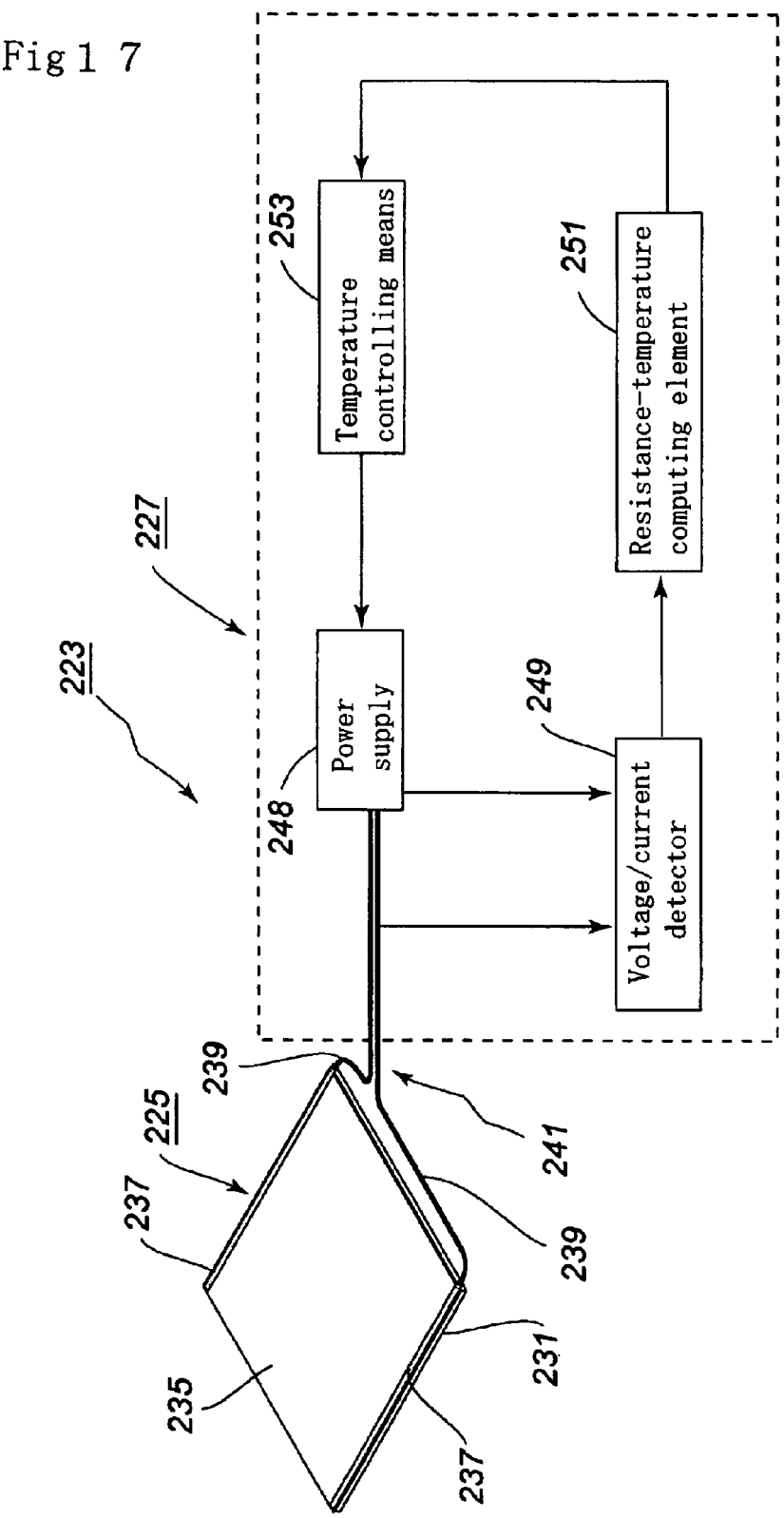
FIG. 17 is a diagram showing the temperature control apparatus of the sixth embodiment.

The transparent plate assembly 225 is adapted to be laminated and contained within the aperture 247 of the housing 245 as shown in FIG. 16. The space between the substrate 231 and the protecting plate 243 is adapted to be filled with a transparent insulating material (i. e. a transparent insulating protecting cover) such as silicone resin exhibiting fluidity and adhesive property to complete the plate assembly 225.

The spacing defined between the outer edge portion of the plate assembly 225 and the housing 245 is filled with black silicone resin, i.e. the insulating securing material with adhesive property, so that the plate assembly 225 is bonded securely to the housing 245.

The cable 241 have been withdrawn through the hole 251.

The arrangement of the control unit 227 will now be described with reference to the block diagram of FIG. 17.

The cable 241 extending from the plate assembly is connected to the control unit 227.

The other ends of the pair of wires 239 are connected to the power supply 248 so that electric current is supplied to the film 235 from the power supply 248.

The voltage and the electric current applied on wires 239 can be detected by means of a voltage/current detector 249. The temperature can be determined by calculating the resistance in the resistance-temperature computing element 251 from the values on both of the detected voltage and current.

The temperature controller 253 can send a command to the power supply 248 to reduce or eliminate the difference between the calculated temperature and a predetermined target temperature set by the controller 253 to zero. Supply to the film 235 from the power supply 248 is controlled by On/Off operation with using a switching means (not shown).

In conclusion, the transparent heater itself will also serve as a temperature sensor. In other words, the substrate, the heater film provided thereon, and the wire for the heater are adapted to be used as those for the sensor. The temperature sensor of this embodiment is a sensor of the type in which the temperature can be detected on the basis of the variation of the resistance. In the sensor of this type, the resistance of the film can be calculated on the basis of the applied voltage and the current varied in response to the variation of the resistance due to the generation of the heat. Then the temperature of the film can be calculated on the basis of the resistance and the temperature-dependent property of the film.

This embodiment does not require an element exclusive for sensing temperature so that the arrangement of the plate assembly 225 will be simpler than the plate assembly 201 of the fifth embodiment.

An electric cable 301 and a transparent plate assembly 303 of a temperature control apparatus for microscopic observation of the seventh embodiment will now be described with reference to FIGS. 18 and 20.

The electric cable 301 includes a pair of signal transmitting cords 305 as shown in FIG. 18(a). Each cord comprises a wire 307 for sensing the temperature and an insulation 309 covering the wire. A plurality of thin wires 311 of copper material for the heater are wound around the insulation 309 of the cord 305. Two cords 305 covered with wires 311 are arranged in parallel with each other and encased within an electrically insulating sheath 313. As can be seen from the drawing the cross-sectional configuration of the sheath 313 is "∞".

If it is intended to connect the cable to the terminals of the film, the sheath 313 is stripped away to expose the distal portion of the wires 311, and then the wires 311 surrounding the insulation 309 are disengaged with the outer peripheral surface of the insulation and twisted them together as shown in FIG. 18(b). The insulation 309 of each cord 305 is then stripped away to expose the wire 307.

Figure 19:
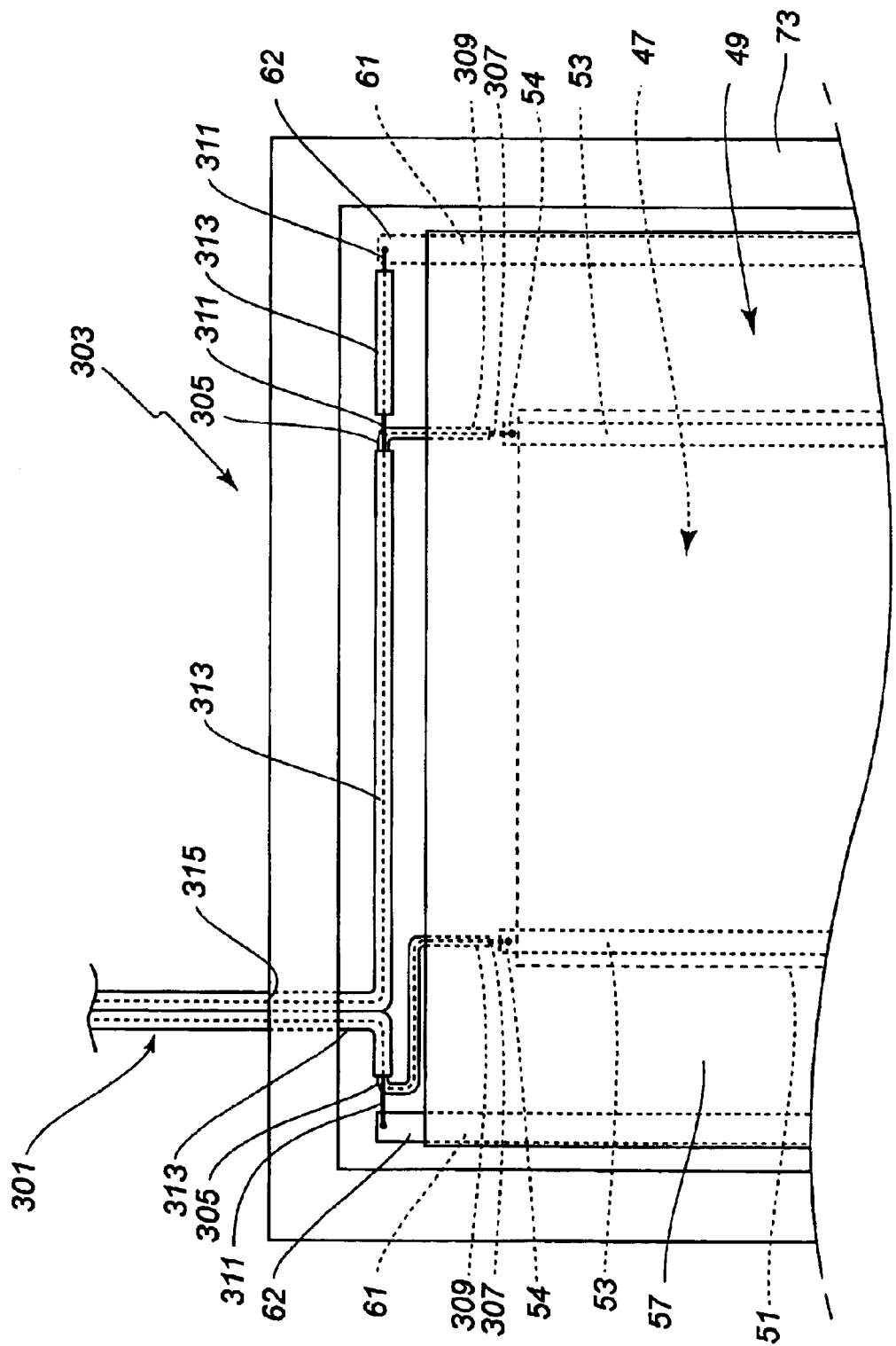
FIG. 19 is a partial plan view showing the transparent plate assembly to which the FIG. 18 cable is connected.
Figure 2:
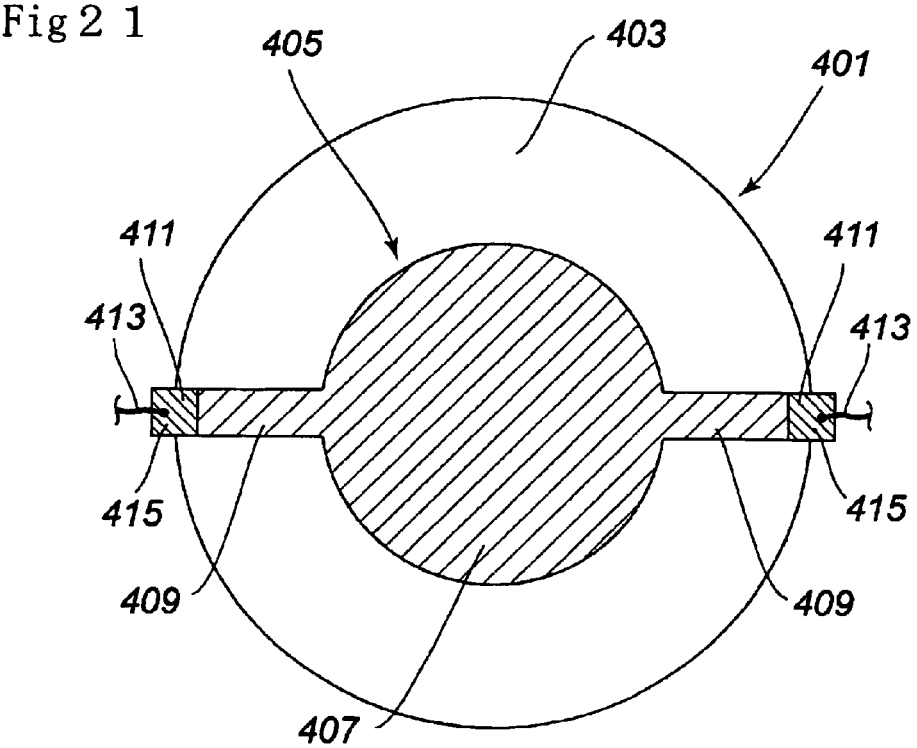
Figure 2:
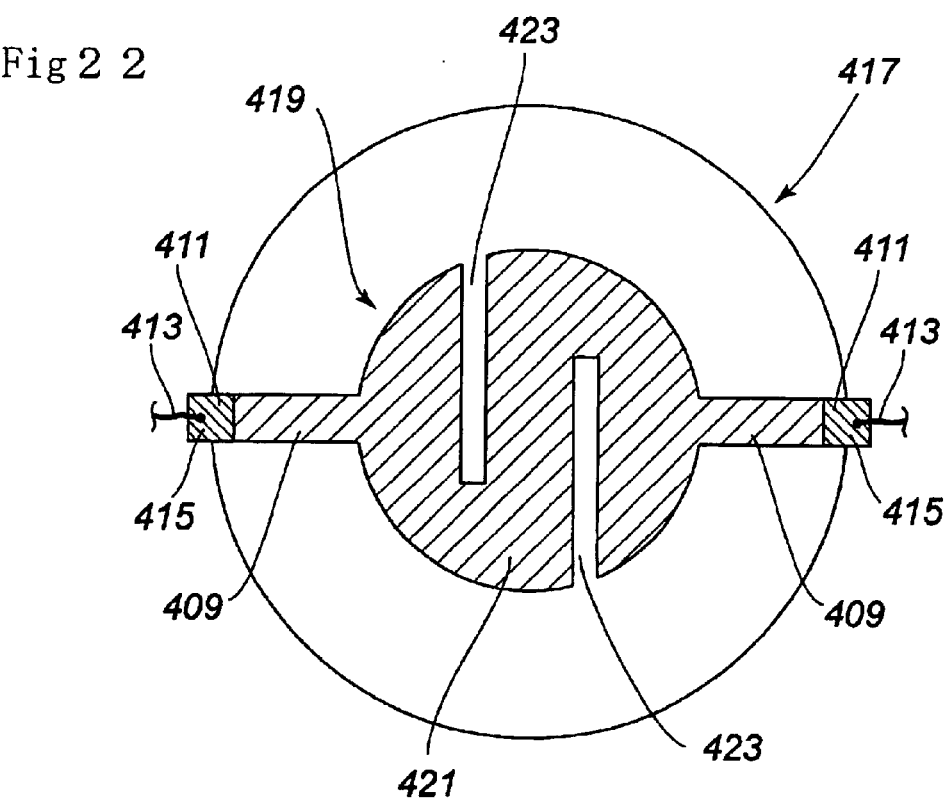
Figure 2:
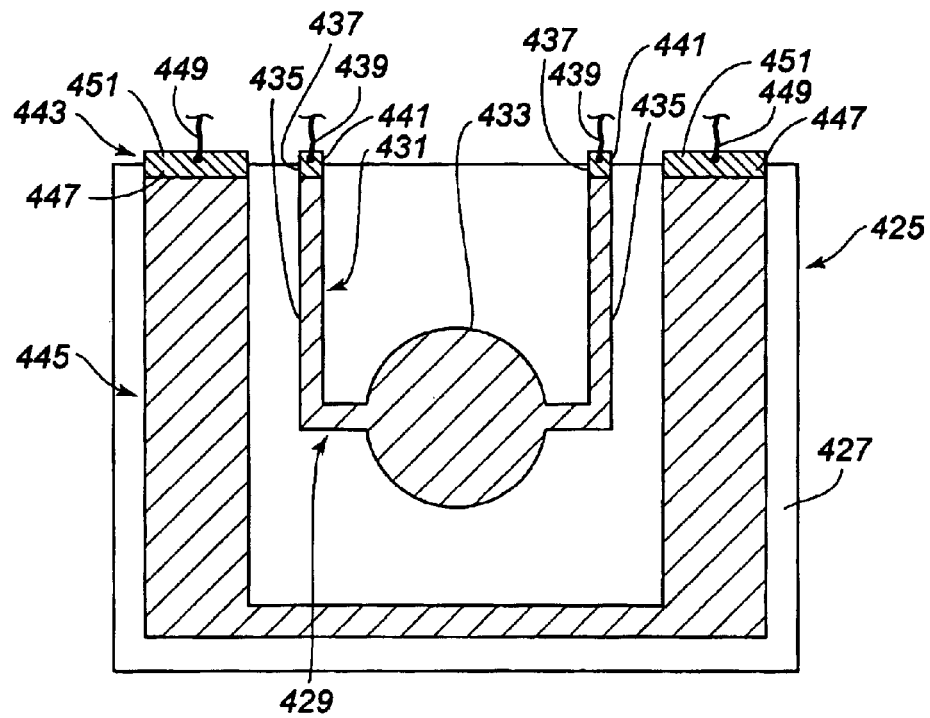
Figure 2:
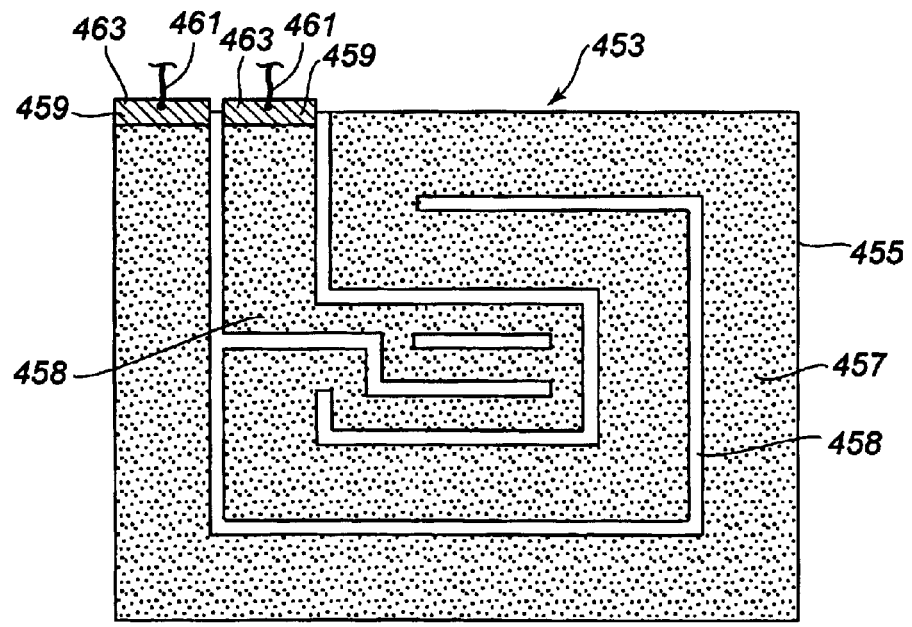

The condition in which the cable 301 is connected to the plate assembly 303 is shown in FIGS. 19 and 20.

The arrangement of the plate assembly 303 may substantially be identical with that of the plate assembly 45 of the second embodiment except for the position of a hole 315 for threading the cable. The members identical with those of the second embodiment are designated by the same reference numeral as those employed in the description of the second embodiment, and the descriptions on them are omitted for the sake of clarity.

The cable 301 threaded through the hole 315 of the side wall of the housing 73 is bifurcated into two cable portions within the housing 73. The twisted wire 311 for the heater bundled as shown in FIG. 18(b) and the cord 305 for transmitting signals are exposed at the distal end of each cable portion.

Each wire 311 is electrically connected by means of electrically conductive adhesive to the extending portion 62 of left or right electrode 61. The insulation 309 of the distal portion of each cord 305 is stripped away therefrom to expose the distal portion of each wire 307. Each distal portion of the wire 307 is secured and connected by means of electrically conductive adhesive to the extending portion 54 of the left or right terminals 53 respectively.

Rightwardly extending portion of the cable 301 is provided with an additional sheath 313 for protect the twisted wire 311 for the heater.

The space between the housing 73 and the outer periphery edges of the transparent face temperature sensor 47 and the transparent face heater 49 is filled with the insulating securing material 68 in the same manner as that of the second embodiment. The cable 301 is also secured to the housing 73 by the securing material 68.

In the arrangement of the seventh embodiment as described above, only the cords 305 are disposed on the portion of the plate assembly 303 for microscopic observation. Thus the substantially thinner apparatus can be obtained.

In the temperature control apparatus of the prior art, since the cable of highly rigid material is used, the cable often interfere with the lens of the microscope upon setting the apparatus on the microscope. Further, the plate assembly can be displaced when the cable is moved inadvertently. Whereas the cable 301 of "∞" shaped cross-section is substantially compliant so that the above mentioned drawbacks of the prior art can be avoided.

A transparent face temperature sensor 401 of a transparent plate assembly of a temperature control apparatus for microscopic observation of the eighth embodiment will now be described with reference to FIG. 21.

The sensor 401 includes a transparent electrically conductive temperature sensor film 405 deposited through the vacuum deposition method on a circular transparent insulating substrate 403 for the temperature sensor. The film 405 includes a circular central portion 407 concentric with the substrate 403 and a pair of outwardly extending branch portions 409. The branch portions 409 are integral with the central portion and disposed symmetrically with each other. This pattern can be fabricated by forming a resist layer on the substrate 403 for masking, depositing the film on the substrate, and then removing the resist. The pattern may be formed by removing the excess portion of the deposited film from the substrate by etching.

A pair of terminals for the temperature sensor designated by the reference numerals 411 are provided on the ends of the branch portions 409. The terminals 411 are electrically connected to the branch portions 409. One end of each terminal extends outwardly beyond the outer periphery of the substrate 403. The terminals 411 are disposed on the film 405 at the diametrically opposite positions.

A pair of wires for the temperature sensor designated by the reference numerals 413 are electrically connected at their one end to the extending portion 415 of the terminals.

The arrangement of the transparent plate assembly of the eighth embodiment is substantially identical with the transparent plate assembly 99 of the fourth embodiment except for the features on the shape as mentioned above. In this connection, the same parts are designated by the same reference numeral and the explanations on them are omitted to avoid the duplication.

The area of the transparent insulating substrate 403 of the sensor 401 is covered partially rather than entirely with the transparent electrically conductive temperature sensing film 405. The areas of the substrate covered with film 405 are the circular central portion 407 on which the specimen to be observed are placed, and the pair of branch portions 409 connected to the terminals 411. This will enhance the precision of the measurement of the temperature of the specimen observed under the microscope.

A temperature sensor 417 of a transparent plate assembly of a temperature control apparatus for the observation through microscope of the type other than the eighth embodiment will now be described with reference to FIG. 22.

A circular concentric central portion 421 of a transparent electrically conductive film 419 for the temperature sensor 417 is provided with two narrow and elongate rectangular blank portions (i. e. the portions on which no film is formed) 423. The other arrangements are substantially identical with the temperature sensor 401 of the eighth embodiment except for the features on the shape as mentioned above.

The resistance of the film can be adjusted by forming patterns such as the blank portions 423 on the film 419. Thus the sensing property of the sensor 417 can be optimized by adjusting the resistance of the film 419 to the range of measurement and the sensitivity of the controller.

A transparent plate assembly of a temperature control apparatus of the ninth embodiment of the present invention for the observation through microscope will now be described with reference to FIGS. 23 and 24.

Shown in FIG. 23 is a transparent face temperature sensor 425 of rectangular configuration including two sensor portions provided on the transparent insulating substrate 427 for the temperature senor. A transparent electrically conductive film 431 of the first sensing portion 429 includes a central circular portion 433 and a pair of L-shaped symmetrical branch portions 435 extending from the central portion 433. Each end of the branch portion 435 is provided with a terminal 437. One end of each terminal extends outwardly beyond the outer periphery of the substrate 427. A pair of wires 439 are electrically connected to the extending portions 441 of the terminals 437 of the sensor at their ends.

A transparent electrically conductive film 445 of the second sensing portion 443 is formed in symmetrical U-shaped configuration surrounding the film 431 of the first sensing portion 429. Each end of the branch portion of the U-shaped film is provided with a terminal 447. One end of each terminal 447 extends outwardly beyond the outer periphery of the substrate 427. A pair of wires 449 are electrically connected to the extending portions 451 of the terminals 449 at their ends.

It can be appreciated that the temperature measuring apparatus of this embodiment includes two independent temperature sensing circuits.

A transparent face heater 453 of temperature sensor 425 is shown in FIG. 24. The heater 453 is formed by providing the transparent electrically conductive heater film 457 by vacuum deposition method on a transparent insulating substrate 455 of the same configuration as that of the substrate 427. The film 457 is provided with a pattern of blank portions 458 so as to reduce the width of the path through which the electric current flows gradually toward the center of the substrate 455. A pair of electrodes for the heater designated by the reference numeral 459 are electrically connected to both ends of the electric path. One end of each terminal 459 extends outwardly beyond the outer periphery of the substrate 455. A pair of wires 461 are electrically connected to the extending portions 463 of the terminals at their ends. The resistance of the heater 453 is increased gradually toward the central portion thereof relative to the outer portion, since the width of the electric path of the heater 453 of this embodiment is decreased toward the central portion. Thus the energy generated by the central portion of the heater is rather higher than the outer portion.

The sensor 425 and the heater 453 are substantially the same as those of the first embodiment except for their configuration. The sensor 425 and the heater 453 are combined in a unit to form a transparent plate assembly.

The plate assembly is adapted to be connected to the control unit 4 of the temperature control apparatus 1 for microscopic observation of the first embodiment according to the invention. The other end of each wire 439 of the first sensing portion 429 and the other end of each wire 449 of the second sensing portion 443 are connected to the sensor 425. The detecting means 133 of the control unit 4 selectively detects the temperature of both sensing portions 429 and 443. The temperature controlling means 135 adjust the current to be delivered to the heater 453, provided that there are a difference between the measured temperature and the predetermined target temperature.

In this embodiment, a plurality of specimens on the plate assembly can be heated at the same time to the different temperature. The temperature of the specimen or specimens to be observed through microscope disposed on the first sensing portion 429 can be measured by the detecting means 133, and the temperature of those disposed on the second sensing portion 429 can also be measured by the detecting means 133. This can be effected by switching the control unit 4, and thus the temperature of the specimen or specimens can be controlled in high precision. This is convenient for comparing and observing a plurality of specimens of the same kind heated at different temperature.

While particular embodiments of the present invention have been illustrated and described, it should be obvious to those skilled in the art that various changes and modifications can be made without departing from the spirit and scope of the invention.

The above mentioned embodiments except for the sixth embodiment employs the transparent face temperature sensor harnessing the thermo-electric power for measuring temperature. These embodiment can retrofit to the transparent face temperature sensor of the type employing the variation of the resistance by substituting the material of the wire. When the sensor of the type employing the variation of the resistance is used in the embodiments except for the sixth embodiment, the temperature can be detected on the basis of the variation of the resistance at the detecting means 133.

With respect to the electrically conductive wires of the sensor of the type harnessing the thermo-electric power for measuring temperature, i.e. the sensor of the thermo-electric power dependent type, any combination of materials which can generate thermo-electric power on the basis of the difference of the temperatures between one end of the wires and the other end of them can be adopted. The combination of the materials considered to be appropriate for the wires are those used in normal thermocouple such as follows; copper and constantan, chromel and alumel, chromel and constantan, iron and constantan, platinum alloy with 30% rhodium and platinum alloy with 6% rhodium, platinum alloy with 13% rhodium and platinum, platinum alloy with 12.8% rhodium and platinum, and platinum alloy with 10% rhodium and platinum. The combinations of copper and constantan, chromel and alumel, chromel and constantan, and iron and constantan are preferred for the sensitivity and the economical reason.

The arrangement for the reference junctions of the normal contact-type thermocouple can be adopted in the reference junctions of the sensor. For example, compensating lead wire can be used as an extension wire.

The transparent electrically conductive film for sensing temperature can be formed of a material exhibiting a good temperature response. The material preferred for the film can be selected from oxides which generate heat energy upon current-supplied or energized due to their resistance such as tin oxide, $SiO_2$-indium alloy, indium oxide, indium oxide doped with tin or antimony (e.g. ITO), tin oxide doped with antimony.

The terminals for the film are provided to assure the connection between the film and the wires to make stable the sensing property. The material for the terminal may be nickel and platinum as well as copper.

In the case of transparent temperature sensor of the type detecting the temperature on the basis of the variation of the resistance, i.e. the sensor of the resistance variation dependent type, any electrically conductive material (metal) can be used.

The transparent electrically conductive film for sensing temperature constituting the temperature measuring portion (resistance) of the resistance thermometer may be made of material exhibiting a good temperature response such as tin oxide, $SiO_2$-indium alloy, indium oxide, indium oxide doped with tin or antimony (e.g. ITO), tin oxide doped with antimony.

Provided that the terminals, the wires and the film are all made of the same material, these parts can be regarded to be one resistance circuit unit. For example, in the case that the film is made of platinum, the terminals are also made of platinum and the wires are made of nickel/platinum clad wire. The terminals can be made of portions of the film extending therefrom.

The information on the temperature can be obtained in a sufficient precision from the temperature control apparatus for the observation through microscope including the sensor either of the resistance variation dependent type or the thermo-electric power dependent type comprising a film of ITO, terminals of copper foil, and wires of copper and constantan (the former type) or copper (the latter type).

The configuration of the terminals is not limited to the band shape or the tab shape regardless of the type of the sensor. In the embodiment as described above, each terminal includes a extending portion to which the wire is to be connected. However, the extending portion is not necessarily be provided.

The form of the terminals attached to the film is not limited to the foil, and can be formed on the film by vacuum deposition. The positions of terminals is not limited to the peripheral edge of the temperature sensing film. The terminal may be provided near the center C of the film.

Provided that the wires can be connected securely on the film, no separate members for the terminal are required, i.e. any portions on the film can be employed as terminals.

The material for the wires of the heater is not limited to copper, and the wire can be made of any material good at its electrical conductivity.

The material for the heater film are preferably, selected to generate through its resistance heat energy upon energized. The preferred materials for the heater film are such material as indium oxide, indium oxide doped with tin or antimony (e.g. ITO), tin oxide doped with antimony, as well as tin oxide and $SiO_2$-indium alloy. The most preferred material is $SiO_2$-indium alloy because of its property for generating heat energy.

The material for the electrodes for the heater is not limited to copper, and any material good at its conductivity can be used.

The material to be used in the transparent insulating substrate or the intermediate insulating sheet should exhibit the transparency and insulating property, and plastic materials such as acrylic resin, polycarbonate, or styrene as well as glass can be used.

The insulating substrate or sheet can be of any configuration such as polygonal or oblong as well as rectangular or circular configuration.

An insulating sheet of paper formed on the rectangular frame can be substituted for the transparent intermediate insulating sheet.

The terminals and electrodes are not limited to the foil, and can be formed as a deposit film by a vacuum deposition method. The material for the insulating sheet is not limited to paper, and pressure sensitive adhesive shingle or double coated tape can be used. Further, the insulating sheet is not necessary a transparent material.

The material used as the transparent insulating material is not limited to silicone resin, and polyurethane resin can be used. However, silicone resin is preferable since silicone resin has adhesive property. The material used as the insulating securing material for securing the housing is not limited to silicone resin, and polyurethane resin can be used. The insulating securing material can be of any colored material since the material is shielded within the housing.

The cable in accordance with the seventh embodiment can of course be used in the first to sixth embodiments according to the invention for microscopic observation The sensor of the eighth embodiment or its alternatives and sensor of the ninth embodiment can be retrofit into the sensor of the resistance variation dependent type by changing the material of the wires for the sensor. Further, the face sensors shown in FIGS. 21, 22, and 23 can also be retrofit into the combined type served also as the face heaters.

The sensor of the eighth embodiment or its alternatives and sensor of the ninth embodiment has a temperature sensing film patterned by forming blank portions with no film. The film can also be patterned by changing the thickness of the film depending on the position. Further the film can be patterned by making a blank portions and different thickness portions.

Industrial Applicability

The temperature control apparatus of the present invention of the above mentioned arrangement can detect the temperature of transparent face through relatively simpler mechanism.

What is claimed is:

1. A transparent face temperature sensor for measuring temperature, comprising:
    a transparent insulating substrate for the sensor,
    a transparent electrically conductive film for the sensor provided on at least either one of the surfaces of the substrate,
    a pair of terminals for the sensor spaced apart from each other a predetermined distance and electrically connected to the film, and
    a pair of wires, respectively, electrically connected at their one end to the pair of terminals;
    wherein the temperature is measured on the basis of the variation of the current or voltage generated by the variation of the temperature of the film.

2. The temperature sensor according to claim 1, further comprising a transparent insulating cover for protecting the transparent sensor film.

3. The temperature sensor according to claim 1, wherein said pair of terminals are disposed in diametrically opposite positions on the film.

4. The temperature sensor according to claim 1, wherein the wires are made of electrically conductive materials of different kinds, together combining to form a thermocouple, the one end of the wires are connected to each other to define a temperature measuring junction of the thermocouple, whereby the temperature of the film is measured by detecting the thermo-electric power generated between the wires.

5. The temperature sensor according to claim 1, wherein the film of the sensor is made of a resistive material which varies the degree of resistance in accordance with the variation of the temperature thereof, the temperature of the film can be measured on the basis of the variation of the resistance of the film.

6. A transparent face temperature control apparatus comprising:
   a transparent face heater on which the temperature sensor according to claim 1 is mounted, the heater comprising;
   a transparent insulating substrate for the heater,
   a transparent electrically conductive film for the heater provided on at least either one of the surfaces of the substrate, and
   a pair of terminals for the heater spaced apart from each other predetermined distance and electrically connected to the film;
   wherein the amount of electric current delivered to the heater is controlled on the basis of temperature information obtained from the sensor.

7. The temperature control apparatus according to claim 6, wherein each of said terminals for the heater includes a portion extending beyond the outer periphery of the substrate, and a pair of wires are electrically connected, respectively, at their one ends to the extending portion of the terminals.

8. The temperature control apparatus according to claim 6, wherein said substrate for the heater is used also as the substrate for the sensor.

9. The temperature control apparatus according to claim 8, wherein said heater film is used also as the sensor film.

10. The temperature control apparatus according to claim 9, wherein the film of the sensor is made of a resistive material which varies the degree of resistance in accordance with the variation of the temperature thereof, and the sensor obtains temperature information from resistance variation of the film.

11. The temperature control apparatus according to claim 10, wherein the sensor is connected to the power supply through the wires of the sensor, and the electric current for heating is delivered to the sensor film through the wires.

12. The temperature control apparatus according to claim 6, wherein the wires are made of electrically conductive materials of different kinds, together combining to form a thermocouple, the one end of the wires are connected to each other to define a temperature measuring junction of the thermocouple, whereby the temperature of the film is measured by detecting the thermo-electric power generated between the wires.

13. The temperature control apparatus according to claim 6, wherein the film of the sensor is made of a resistive material which varies the degree of resistance in accordance with the variation of the temperature thereof, and the sensor obtains temperature information from resistance variation of the film.

14. The temperature control apparatus according to claim 6, wherein the apparatus is used for microscopic observation and the transparent face heater and the transparent face temperature sensor, together combine to form a transparent plate assembly, which will be mounted on the stage of microscope.

* * * * *